United States Patent
Xiao et al.

(10) Patent No.: US 12,240,951 B2
(45) Date of Patent: Mar. 4, 2025

(54) PROCESS FOR PRODUCING HYDROGEN FROM THERMOPLASTIC POLYMERS WITH ELECTROMAGNETIC RADIATION

(71) Applicant: Oxford University Innovation Limited, Oxford (GB)

(72) Inventors: Tiancun Xiao, Oxford (GB); Peter P. Edwards, Oxford (GB); Xiangyu Jie, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 942 days.

(21) Appl. No.: 15/734,252

(22) PCT Filed: Jun. 4, 2019

(86) PCT No.: PCT/GB2019/051541
§ 371 (c)(1),
(2) Date: Dec. 2, 2020

(87) PCT Pub. No.: WO2019/234408
PCT Pub. Date: Dec. 12, 2019

(65) Prior Publication Data
US 2021/0214517 A1    Jul. 15, 2021

(30) Foreign Application Priority Data
Jun. 5, 2018 (GB) ..................... 1809199

(51) Int. Cl.
| | | |
|---|---|---|
| *C08J 11/16* | (2006.01) | |
| *B01J 19/12* | (2006.01) | |
| *B01J 21/04* | (2006.01) | |
| *B01J 23/745* | (2006.01) | |
| *B01J 35/40* | (2024.01) | |
| *C01B 3/02* | (2006.01) | |
| *C01B 3/26* | (2006.01) | |
| *C01B 32/162* | (2017.01) | |

(52) U.S. Cl.
CPC ............ *C08J 11/16* (2013.01); *B01J 19/126* (2013.01); *B01J 21/04* (2013.01); *B01J 23/745* (2013.01); *B01J 35/40* (2024.01); *C01B 3/02* (2013.01); *C01B 3/26* (2013.01); *C01B 32/162* (2017.08); *B01J 2219/00141* (2013.01); *C01B 2203/0277* (2013.01); *C01B 2203/0855* (2013.01)

(58) Field of Classification Search
CPC ........................................................ C08J 11/16
See application file for complete search history.

(56) References Cited

U.S. PATENT DOCUMENTS

| | | | |
|---|---|---|---|
| 6,184,427 B1* | 2/2001 | Klepfer ............... | C10G 1/10 201/2.5 |
| 8,092,778 B2 | 1/2012 | Zhu et al. | |
| 2011/0002842 A1 | 1/2011 | Watanabe et al. | |
| 2012/0138601 A1* | 6/2012 | Hemmings ........... | C10G 1/10 219/679 |

FOREIGN PATENT DOCUMENTS

| | | |
|---|---|---|
| CN | 1850583 A | 10/2006 |
| CN | 107151834 A | 9/2017 |
| CN | 107570156 A | 1/2018 |
| CN | 107934938 A | 4/2018 |
| RU | 2537850 C1 | 1/2015 |
| WO | 2007/019739 A1 | 2/2007 |
| WO | 2016/203264 A1 | 12/2016 |
| WO | 2018/096103 A1 | 5/2018 |

OTHER PUBLICATIONS

International Search Report & Written Opinion for WO2019/234408 (PCT/GB2019/051541), dated Aug. 21, 2019, pp. 1-14.
UK Search Report for GB1809199.1, dated Nov. 13, 2018, pp. 1-5.
Yao Dingding et al: "Co-production of hydrogen and carbon nanotubes from real-world waste plastics: Influence of catalyst composition and operational parameters", Applied Catalysis B: Environmental, vol. 221, Sep. 18, 2017 (Sep. 18, 2017), pp. 584-597.

* cited by examiner

Primary Examiner — Irina Krylova
(74) Attorney, Agent, or Firm — Thomas|Horstemeyer, LLP

(57) ABSTRACT

The present invention provides a process for (a) recycling plastic; and/or (b) producing hydrogen; and/or (c) producing syngas; and/or (d) producing carbon nanotubes, wherein the process comprises exposing a solid composition comprising one or more thermoplastic or thermosetting polymers to electromagnetic radiation in the presence of a solid catalyst, wherein the catalyst comprises elemental iron (Fe) or an oxide thereof. Also provided is a solid composition comprising a catalyst in intimate mixture with one or more thermoplastic or thermosetting polymers, wherein the catalyst comprises elemental iron (Fe) or an oxide thereof. Also provided is the use of said solid composition to produce hydrogen, syngas and/or carbon nanotubes, and a microwave reactor comprising said solid composition.

9 Claims, 11 Drawing Sheets

A

B

C

D

US 12,240,951 B2

PROCESS FOR PRODUCING HYDROGEN FROM THERMOPLASTIC POLYMERS WITH ELECTROMAGNETIC RADIATION

CROSS-REFERENCE TO RELATED APPLICATIONS

This application is the National Stage of International Application No. PCT/GB2019/051541, filed Jun. 4, 2019, which claims priority to GB 1809199.1, filed Jun. 5, 2018, which are entirely incorporated herein by reference.

INTRODUCTION

The present invention relates to a process for recycling plastic. In particular, the process of the present invention provides a catalytic process for converting waste plastic to useful materials such as hydrogen, syngas and/or carbon nanotubes.

BACKGROUND OF THE INVENTION

Today, the world's ever-increasing energy demand is still based almost exclusively on fossil fuels, not only because of their unrivalled energy-carrying properties but also because of their ready application to meet the demands of the world-wide energy infrastructure which has developed over the past century.

Hydrogen is regarded as one of the key energy solutions for the future (1-5), not only because of its intensive energy density per unit-mass, but also because its application at the point of use in, for example combustion of fuel cells, produces no environmentally harmful carbon dioxide. Hence the problem of capturing this by-product is circumvented (1-5).

However, the cost of hydrogen production, delivery, and storage systems is the major barrier that hinders the development of hydrogen-based economy (1, 6-12). The most efficient and widely used process so far for the production of hydrogen in industry is based on fossil fuel, for example by steam reforming or partial oxidation of methane and to a lesser degree by gasification of coal (3, 12-14). However, like combustion of hydrocarbons, all these conventional options of hydrogen production from hydrocarbons involve $CO_2$ production, which is environmentally undesirable. Therefore, technologies like Carbon Capture and Storage (CCS) and Carbon Capture and Utilization (CCU) are needed to control the $CO_2$ level (1, 15).

There is a need for new processes for the release of high purity hydrogen from a suitable hydrocarbon-containing material. It would be of further benefit if the hydrocarbon-containing material was cheap and abundant.

Plastic materials are very widely used throughout the world and the trend is that many forms of plastics material will be more extensively used in the future. However it is well known that many plastic materials because of their stability in use are not bio-degradable and that significant problems exist in the disposal of such materials. Accordingly, if current production and waste management trends continue, roughly 12,000 Mt of plastic waste will be in landfills or in the natural environment by 2050 (16).

Between 1950 and 2015, cumulative waste generation of primary and secondary (recycled) plastic waste amounted to 6300 Mt, of this approximately 800 Mt (12%) of plastics have been incinerated and 600 Mt (9%) have been recycled; only 10% of which have been recycled more than once. Around 4900 Mt—60% of all plastics ever produced—have been discarded and are accumulating in landfills or in the natural environment.

Processes for conversion of waste plastics and other solid hydrocarbon materials to other useful products are known. For instance, plastic depolymerisation techniques were developed actively during the 1980s and 1990s, but none was adopted commercially as mechanical recycling methods developed rapidly.

Over the past 10 years there has been an increase in the amount of research into the conversion of plastic into hydrocarbon fuels as oil prices have increased and waste collection and sorting methods have improved. There are now several processes operating close to commercial viability in different parts of the world. The processes that have the most technical and commercial potential are pyrolysis to make synthetic crude oil mixtures and liquid-phase catalytic depolymerisation to make mixed distillates.

Pyrolysis processes have a relatively low capital cost and a relatively high yield (60-70% of the feedstock is converted to a liquid fuel). However, the stability, ease of handling and quality of these oil products is low and further processing is required to give a fuel product.

The present invention seeks to provide a simple, compact and readily accessible technology for rapid hydrogen generation from a solid composition comprising one or more thermoplastic or thermosetting polymers. In some embodiments, the present invention provides high purity hydrogen with minimal production of carbon dioxide. Suitably, in some embodiments, useful carbonaceous materials (e.g. carbon nanotubes) are formed.

SUMMARY OF THE INVENTION

The present invention provides a simple and compact process for the production of hydrogen from polymeric hydrocarbons using the assistance of electromagnetic radiation. This allows the production of highly pure hydrogen with minimal gaseous carbon by-products (such as $CO_2$, CO and small hydrocarbons).

This technology has particular application to the decomposition and/or recycling of waste plastics.

Accordingly, in a first aspect the present invention provides a process for
  (a) recycling plastic; and/or
  (b) producing hydrogen; and/or
  (c) producing syngas; and/or
  (d) producing carbon nanotubes,
wherein the process comprises exposing a solid composition comprising one or more thermoplastic or thermosetting polymers to electromagnetic radiation in the presence of a catalyst, wherein the catalyst comprises elemental iron (Fe) or an oxide thereof.

In a second aspect, the present invention provides a solid composition comprising a catalyst in admixture with one or more thermoplastic or thermosetting polymer wherein the catalyst comprises iron (Fe) in elemental form or an oxide thereof.

In a third aspect, the present invention provides the use of a solid composition according to the second aspect for:
  (a) recycling plastic; and/or
  (b) producing hydrogen; and/or
  (c) producing syngas; and/or
  (d) producing carbon nanotubes, In a fourth aspect, the present invention provides a microwave reactor comprising a solid composition according to the second aspect.

Preferred, suitable, and optional features of any one particular aspect of the present invention are also preferred, suitable, and optional features of any other aspect.

BRIEF DESCRIPTION OF THE DRAWINGS

FIG. 9 shows absorbed MW power and reaction temperature for polypropylene (PP) dehydrogenation over FeOx·Al$_2$O$_3$_C (Fe 74.4 wt. %; Al 28.6 wt. %) catalyst.

DETAILED DESCRIPTION OF THE INVENTION

Definitions

Figure 1:
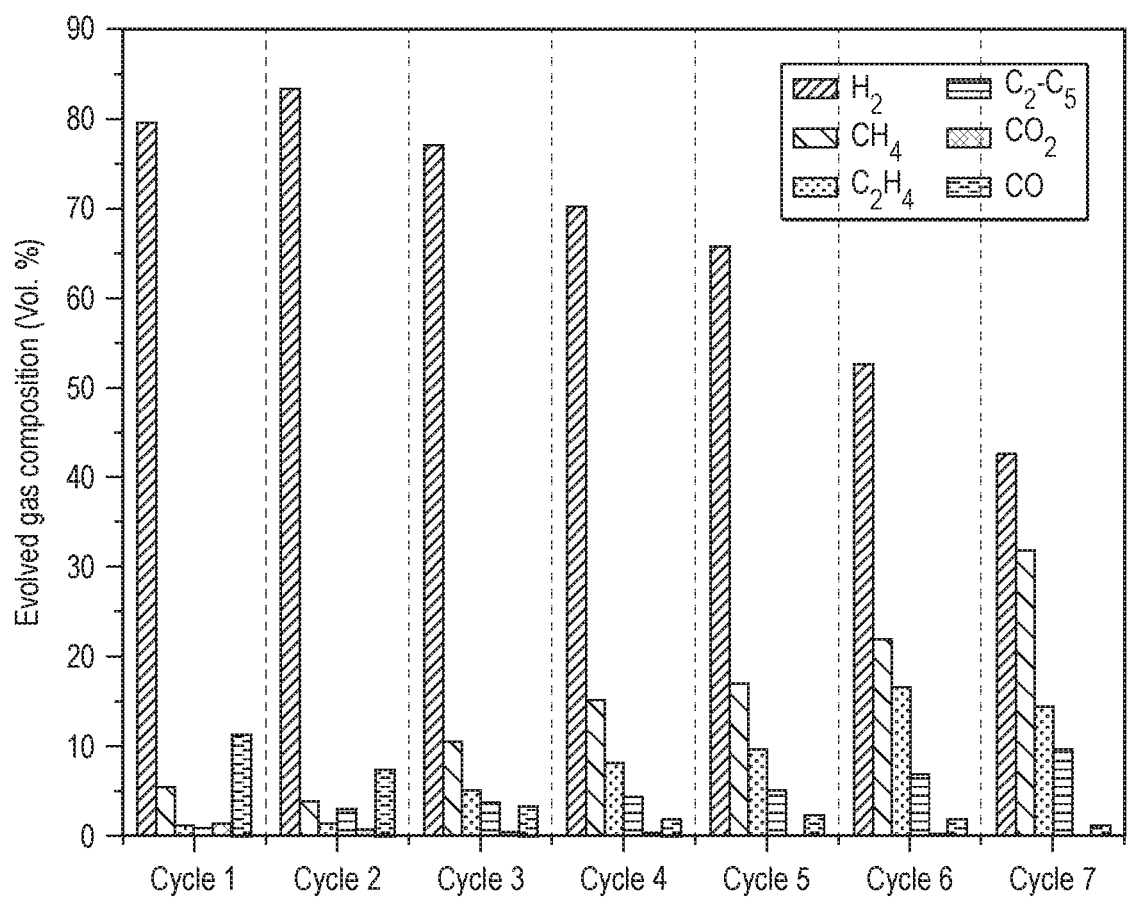
FIG. 1 shows the evolved gas composition (vol. %) from PE dehydrogenation over FeOx·Al$_2$O$_3$—C(Fe 74.4 wt. %; Al 28.6 wt. %) catalyst.

As used herein the term "solid composition" refers to a composition which is solid at standard ambient temperature and pressure (SATP), i.e. at a temperature of 298.15 K (25° C.) and at 100,000 Pa (1 bar, 14.5 psi, 0.9869 atm).

As used herein the term "solid catalyst" refers to a catalyst which is solid at standard ambient temperature and pressure (SATP), i.e. at a temperature of 298.15 K (25° C.) and at 100,000 Pa (1 bar, 14.5 psi, 0.9869 atm).

As used herein, the term "recycling" refers to the conversion of a material, generally a waste or unwanted material, into alternative materials which may either be more easily disposed of or have renewed application. Suitably, recycling converts a material into an alternative material having at least one new or renewed application. In the present invention, waste plastic may be recycled into a range of materials, including for example, hydrogen, syngas and/or carbon nanotubes.

As used herein the term "plastic" refers to a solid material which comprises one or more thermoplastic or thermosetting polymers. Suitably, the plastic (essentially) consists of one or more thermoplastic or thermosetting polymers. Suitably the plastic (essentially) consists of one or more thermoplastic polymers. Suitably, the plastic is waste plastic which may be a mixture of various plastics. Commonly plastics are referred to by the name of the polymer of which they consist. Examples of common plastics are polyethylene, polypropylene and polystyrene.

As used herein the term "thermoplastic polymer" refers to a polymer which becomes pliable or mouldable above a certain temperature and solidifies upon cooling, but can be remelted on heating. Suitable thermoplastic polymers used herein have a melting temperature from about 60° C. to about 300° C., from about 80° C. to about 250° C., or from about 100° C. to about 250° C. Suitably, the thermoplastic polymer is one which is commonly comprised in commercial plastic products. Suitable thermoplastic polymers generally include polyolefins, polyesters, polyamides, copolymers thereof, and combinations thereof. Examples of thermoplastic polymers include polyethylene (PE), polypropylene (PP), polystyrene (PS), polyvinylchloride (PVC), polyamideimide, polymethylmethacrylate (PMMA), polytetrafluoroethylene, polyethylene terephthalate (PET), natural rubber (NR), and polycarbonate (PC), polyvinylidene chloride (PVDC), acrylonitrile butadiene styrene (ABS), polyurethanes (PU).

As used herein the term "thermosetting polymer" refers to a polymer which is irreversibly cured and cannot be reworked upon reheating. Suitably, the thermosetting polymer is one commonly comprised in commercial plastic products. Examples of thermosetting polymers are polyurethane and polyoxybenzylmethylenglycolanhydride (Bakelite™).

As used herein, the term "admixture" refers the physical combination of two or more substances in which the identities of each substance is retained. Admixture may suitably be prepared by mechanical mixing (e.g blending) two substances together.

As used herein, the term "intimate admixture" means that substantially all of the individual particles of the admixture are composed of all of the component substances of the admixture. Reference is made to substantially all of the particles because it is possible from a purely statistical stand point that a small number of the particles might contain only one of the component substances or lack the full complement of component substances. Suitably, an intimate admixture is prepared by extrusion, dispersion or granulation of two of more substances which may optionally be further processed to a requisite particle size for instance by grinding, milling or blending.

Process

In one aspect, the present invention provides a process for
(a) recycling plastic; and/or
(b) producing hydrogen; and/or
(c) producing syngas; and/or
(d) producing carbon nanotubes,
wherein the process comprises exposing a solid composition comprising one or more thermoplastic or thermosetting polymers to electromagnetic radiation in the presence of a catalyst, wherein the catalyst comprises iron (Fe) in elemental form or an oxide thereof.

In one embodiment, the present invention provides a process for recycling plastic, wherein the process comprises exposing a solid composition comprising one or more thermoplastic or thermosetting polymers to electromagnetic radiation in the presence of a solid catalyst, wherein the catalyst comprises iron (Fe) in elemental form or an oxide thereof.

Suitably, the plastic is waste plastic. In one embodiment, the plastic is mixture of plastics. In one embodiment, the plastic comprises a mixture of polyethylene, polypropylene and polystyrene.

In one embodiment, the present invention provides a process for producing hydrogen, wherein the process comprises exposing a solid composition comprising one or more thermoplastic or thermosetting polymers to electromagnetic radiation in the presence of a solid catalyst, wherein the catalyst comprises iron (Fe) in elemental form or an oxide thereof.

In one embodiment, the process produces about 50 vol. % or more of hydrogen in the total amount of evolved gas. Suitably, about 55 vol. % or more of hydrogen in the total amount of evolved gas, more suitably about 60 vol. % or more of hydrogen, more suitably about 65 vol. % or more of hydrogen, more suitably about 70 vol. % or more of hydrogen, more suitably about 75 vol. % or more of hydrogen, or more suitably about 80 vol. % or more of hydrogen in the total amount of evolved gas.

In one embodiment, the process produces about 50 vol. % to about 85 vol. % of hydrogen in the total amount of evolved gas. Suitably, about 55 vol. % to about 85 vol. % of hydrogen in the total amount of evolved gas, more suitably about 60 vol. % to about 85 vol. % of hydrogen, more suitably about 65 vol. % to about 85 vol. % of hydrogen, more suitably about 65 vol. % to about 85 vol. % of hydrogen, more suitably about 70 vol. % to about 85 vol. % of hydrogen, or more suitably about 75 vol. % to about 85 vol. % of hydrogen in the total amount of evolved gas.

In one embodiment, the process produces about 5 vol. % or less of carbon dioxide in the total amount of evolved gas. Suitably, about 4 vol. % or less of carbon dioxide in the total amount of evolved gas, more suitably about 3 vol. % or less of carbon dioxide, more suitably about 2 vol. % or less of carbon dioxide, more suitably about 1 vol. % or less of carbon dioxide, more suitably about 0.5 vol. % or less of carbon dioxide, more suitably about 0.25 vol. % or less of carbon dioxide or more suitably about 0.1 vol. % or less of carbon dioxide in the total amount of evolved gas.

In one embodiment, the process produces about 0.1 vol. % to about 10 vol. % of carbon dioxide in the total amount of evolved gas. Suitably, about 0.1 vol. % to about 9 vol. % of carbon dioxide in the total amount of evolved gas, more suitably about 0.1 vol. % to about 8 vol. % of carbon dioxide, more suitably about 0.1 vol. % to about 7 vol. % of carbon dioxide, more suitably about 0.1 vol. % to about 6 vol. % of carbon dioxide, more suitably about 0.1 vol. % to about 5 vol. % of carbon dioxide, more suitably about 0.1 vol. % to about 4 vol. % of carbon dioxide, more suitably about 0.1 vol. % to about 3 vol. % of carbon dioxide, more suitably about 0.1 vol. % to about 2 vol. % of carbon dioxide, more suitably about 0.1 vol. % to about 1 vol. % of carbon dioxide, more suitably about 0.1 vol. % to about 0.5 vol. % of carbon dioxide, more suitably about 0.1 vol. % to about 0.3 vol. % of carbon dioxide in the total amount of evolved gas, more suitably about 0.1 vol. % to about 0.2 vol. % of carbon dioxide in the total amount of evolved gas.

In one embodiment, the process produces about 15 vol. % or less of carbon monoxide in the total amount of evolved gas. Suitably, about 10 vol. % or less of carbon monoxide in the total amount of evolved gas, more suitably about 9 vol. % or less of carbon monoxide, more suitably about 8 vol. % or less of carbon monoxide, more suitably about 8 vol. % or less of carbon monoxide, more suitably about 7 vol. % or less of carbon monoxide, more suitably about 6 vol. % or less of carbon monoxide, or more suitably about 5 vol. % or less of carbon monoxide, more suitably about 4 vol. % or less of carbon monoxide, more suitably about 3 vol. % or less of carbon monoxide, more suitably about 2 vol. % or less of carbon monoxide, more suitably about 1 vol. % or less of carbon monoxide in the total amount of evolved gas.

In one embodiment, the process produces about 1 vol. % to about 10 vol. % of carbon monoxide in the total amount of evolved gas. Suitably, about 1 vol. % to about 9 vol. % of carbon monoxide in the total amount of evolved gas, more suitably about 1 vol. % to about 8 vol. % of carbon monoxide, more suitably about 1 vol. % to about 7 vol. % of carbon monoxide, more suitably about 1 vol. % to about 6 vol. % of carbon monoxide, more suitably about 1 vol. % to about 5 vol. % of carbon monoxide, more suitably about 1 vol. % to about 4 vol. % of carbon monoxide, more suitably about 1 vol. % to about 3 vol. % of carbon monoxide, more suitably about 1 vol. % to about 2 vol. % of carbon monoxide in the total amount of evolved gas.

In one embodiment, the process produces about 15 vol. % or less of methane in the total amount of evolved gas. Suitably, about 10 vol. % or less of methane in the total amount of evolved gas, more suitably about 9 vol. % or less of methane, more suitably about 8 vol. % or less of methane, more suitably about 8 vol. % or less of methane, more suitably about 7 vol. % or less of methane, more suitably about 6 vol. % or less of methane or more suitably about 5 vol. % or less of methane, more suitably about 4 vol. % or less of methane, more suitably about 3 vol. % or less of methane in the total amount of evolved gas.

In one embodiment, the process produces about 3 vol. % to about 20 vol. % of methane in the total amount of evolved gas. Suitably, about 3 vol. % to about 15 vol. % of methane in the total amount of evolved gas, more suitably about 3 vol. % to about 10 vol. % of methane, more suitably about 3 vol. % to about 9 vol. % of methane, more suitably about 3 vol. % to about 8 vol. % of methane, more suitably about 3 vol. % to about 7 vol. % of methane, more suitably about 3 vol. % to about 6 vol. % of methane, more suitably about 3 vol. % to about 5 vol. % of methane, more suitably about 3 vol. % to about 4 vol. % of methane in the total amount of evolved gas.

In one embodiment, the process produces about 60 vol. % hydrogen or more and about 5 vol. % of carbon dioxide or less in the total evolved gas. Suitably, in this embodiment, the amount of carbon dioxide is 4 vol. % or less, more suitably 3 vol. % or less, more suitably 2 vol. % or less, more suitably 1 vol. % or less in the total evolved gas.

In one embodiment, the process produces about 70 vol. % hydrogen or more and about 5 vol. % of carbon dioxide or less in the total evolved gas. Suitably, in this embodiment, the amount of carbon dioxide is 4 vol. % or less, more suitably 3 vol. % or less, more suitably 2 vol. % or less, more suitably 1 vol. % or less in the total evolved gas.

In one embodiment, the process produces about 60 vol. % to about 80 vol. % hydrogen and about 2 vol. % to about 20 vol. % of carbon dioxide in the total evolved gas.

In one embodiment, the process produces about 60 vol. % to about 80 vol. % hydrogen and about 2 vol. % to about 15 vol. % of carbon dioxide in the total evolved gas.

In one embodiment, the process produces about 60 vol. % to about 80 vol. % hydrogen and about 2 vol. % to about 10 vol. % of carbon dioxide in the total evolved gas.

In one embodiment, the process produces about 60 vol. % hydrogen or more and about 20 vol. % of methane or less in the total evolved gas. Suitably, in this embodiment, the amount of methane is 15 vol. % or less, more suitably 10 vol. % or less, more suitably 8 vol. % or less, more suitably 5 vol. % of methane or less in the total evolved gas.

In one embodiment, the process produces about 70 vol. % hydrogen or more and about 20 vol. % of methane or less in the total evolved gas. Suitably, in this embodiment, the amount of methane is 15 vol. % or less, more suitably 10 vol. % or less, more suitably 8 vol. % or less, more suitably 5 vol. % of methane or less in the total evolved gas.

In one embodiment, the process produces about 60 vol. % to about 80 vol. % hydrogen and about 3 vol. % to about 20 vol. % of methane in the total evolved gas.

In one embodiment, the process produces about 60 vol. % to about 80 vol. % hydrogen and about 3 vol. % to about 15 vol. % of methane in the total evolved gas.

In one embodiment, the process produces about 60 vol. % to about 80 vol. % hydrogen and about 3 vol. % to about 10 vol. % of methane in the total evolved gas.

In one embodiment, the present invention provides a process for producing syngas, wherein the process comprises exposing a solid composition comprising one or more thermoplastic or thermosetting polymers to electromagnetic radiation in the presence of a solid catalyst, wherein the catalyst comprises iron (Fe) in elemental form or an oxide thereof.

In one embodiment, the present invention provides a process for producing carbon nanotubes, wherein the process comprises exposing a solid composition comprising one or more thermoplastic or thermosetting polymers to electromagnetic radiation in the presence of a solid catalyst, wherein the catalyst comprises iron (Fe) in elemental form or an oxide thereof.

In one embodiment, the present invention provides a process for co-producing hydrogen and carbon nanotubes, wherein the process comprises exposing a solid composition comprising one or more thermoplastic or thermosetting polymers to electromagnetic radiation in the presence of a solid catalyst, wherein the catalyst comprises iron (Fe) in elemental form or an oxide thereof.

In one embodiment, the process of each of the above embodiments is carried out in an atmosphere substantially free of oxygen. Suitably, an atmosphere free of oxygen. In another embodiment, process comprises exposing the composition to electromagnetic radiation in an atmosphere substantially free of oxygen, suitably free of oxygen.

In another embodiment, the process is carried out in an atmosphere substantially free of water. Suitably, an atmosphere free of water. In another embodiment, process comprises exposing the composition to electromagnetic radiation in an atmosphere substantially free of water, suitably free of water.

In another embodiment, the process is carried out in an atmosphere substantially free of oxygen and water. Suitably, an atmosphere free of oxygen and water. In another embodiment, process comprises exposing the composition to electromagnetic radiation in an atmosphere substantially free of oxygen and water, suitably free of oxygen and water.

In another embodiment, the process is carried out in an inert atmosphere. In another embodiment, process comprises exposing the composition to electromagnetic radiation in an inert atmosphere.

The inert atmosphere may for instance be an inert gas or a mixture of inert gases. The inert gas or mixture of inert gases typically comprises a noble gas, for instance argon. In one embodiment the inert gas is argon. In another embodiment the inert gas is nitrogen.

The process may comprise purging the solid composition with an inert gas or mixture of inert gases prior to exposing the composition to the electromagnetic radiation.

In one embodiment the solid composition is contacted with the catalyst prior to, during or both prior to and during exposure to the electromagnetic radiation.

The composition may be contacted with the catalyst by any suitable method. For instance, the solid composition may be mixed with the catalyst. The solid composition may be mixed with the solid catalyst by methods known in the art such as milling, granulating, extruding or blending. Suitably the solid composition and the catalyst are in intimate admixture during exposure to the electromagnetic radiation.

In the process of the invention, the composition is exposed to electromagnetic radiation in the presence of the catalyst in order to effect, or activate, the decomposition of the polymers in the composition to produce hydrogen, syngas and/or carbon nanotubes. Said decomposition may be catalytic decomposition. Exposing the composition to the electromagnetic radiation may cause the composition to heat up, but does not necessarily cause it to be heated. Other possible effects of the electromagnetic radiation to which the composition is exposed (which may be electric or magnetic field effects) include, but are not limited to, field emission, plasma generation and work function modification. For instance, the high fields involved can modify catalyst work functions and can lead to the production of plasmas at the catalyst surface, further shifting the character of the chemical processes involved. Any one or more of such effects of the electromagnetic radiation may be responsible for, or at least contribute to, effecting, or activating, the catalytic decomposition of the composition to produce hydrogen, syngas and/or carbon nanotubes.

The process, and in particular the step of exposing the composition to the electromagnetic radiation, may alternatively be carried out at temperatures and/or pressures other than SATP. Indeed, both very low and very high temperatures can be employed, i.e. from far below ambient to far above ambient, as could very low and high pressures. Usually, however, the step of exposing the composition to the electromagnetic radiation is carried out at temperatures and pressures that are at or relatively close to SATP.

The process may for instance comprise exposing the composition to the electromagnetic radiation, at a temperature of from −150° C. to 2,000° C., or for instance at a temperature of from −80° C. to 1,000° C., for instance from −20° C. to 400° C., for instance from 0° C. to 200° C., or at a temperature of from 5° C. to 100° C., or for instance from 10° C. to 50° C.

Additionally, the process may comprise exposing the composition to the electromagnetic radiation, at a pressure of from 0.01 bar to 100 bar, or for instance at a pressure of from 0.1 10 bar to 10 bar, for instance from 0.5 bar to 5 bar, or for example from 0.5 bar to 2 bar. In a more typical case, the process comprises exposing the composition to the electromagnetic radiation, at a temperature of from 0° C. to 200° C. and at a pressure of from 0.5 bar to 5 bar. For instance, it may comprise exposing the composition to the electromagnetic radiation, at a temperature of from 10° C. to 50° C. and at a pressure of from 0.5 bar to 2 bar.

Typically, the process is complete in about 1 second to about 3 hours, for instance in a batch-wise process. Suitably, the process is complete within about 1 second to about 1 hour, more suitably about 1 second to about 10 minutes, more suitably about 1 second to about 5 minutes.

In one embodiment, the process is complete in 10 seconds to about 3 hours, for instance in a batch-wise process.

Suitably, the process is complete within about 10 seconds to about 1 hour, more suitably about 10 seconds to about 10 minutes, more suitably about 10 seconds to about 5 minutes.

In another embodiment, the process is complete in 30 seconds to about 3 hours, for instance in a batch-wise process. Suitably, the process is complete within about 30 seconds to about 1 hour, more suitably about 30 seconds to about 10 minutes, more suitably about 30 seconds to about 5 minutes.

Catalyst

The catalyst employed in the process of the present invention comprises elemental iron (Fe) or an oxide thereof. Suitably the catalyst is a solid catalyst.

In one embodiment, the catalyst comprises at least about 40 wt. % of Fe relative to the total weight of the catalyst. For example, the catalyst may comprise at least about 45 wt. % of Fe relative to the total weight of the catalyst. Suitably, at least about 50 wt. % of Fe relative to the total weight of the catalyst, more suitably at least about 55 wt. % of Fe, more suitably at least about 60 wt. % of Fe, more suitably at least about 65 wt. % of Fe, more suitably at least about 70 wt. % of Fe, more suitably at least about 75 wt. % of Fe, more suitably at least about 80 wt. % of Fe, more suitably at least about 85 wt. % of Fe, more suitably at least about 90 wt. % of Fe, more suitably at least about 95 wt. % of Fe.

In one embodiment, the catalyst comprises about 40 wt. % to about 95 wt. % of Fe relative to the total weight of the catalyst. For example, the catalyst may comprise about 45 wt. % to about 95 wt. % of Fe relative to the total weight of the catalyst. Suitably, about 50 wt. % to about 95 wt. % of Fe relative to the total weight of the catalyst, more suitably about 55 wt. % to about 95 wt. % of Fe, more suitably about 60 wt. % to about 95 wt. % of Fe, more suitably about 65 wt. % to about 95 wt. % of Fe, more suitably about 70 wt. % to about 95 wt. % of Fe, more suitably about 75 wt. % to about 95 wt. % of Fe, more suitably about 80 wt. % to about 95 wt. % of Fe, more suitably about 85 wt. % to about 95 wt. % of Fe, more suitably about 90 wt. % to about 95 wt. % of Fe, more suitably about 90 wt. % of Fe.

As used herein, the term "elemental Fe" refers to iron only when in an oxidation state of zero.

In one embodiment, the catalyst comprises, essentially consists of, or consists of elemental Fe.

In another embodiment, the catalyst comprises, essentially consists of, or consists of an iron oxide. Suitably the iron oxide is selected from one or more of FeO, $Fe_2O_3$ and $Fe_3O_4$. Suitably, the iron oxide is $Fe_2O_3$.

Typically, the catalyst is in particulate form, wherein particle size is about 10 mm or less. In one embodiment, the particle size is about 5 mm or less, suitably, 1 mm or less. In another embodiment, the particle size is between about 20 nm and 1 mm.

Suitably, the mean particle size is about 50 nm to about 1 mm; or the mean particle size is about 50 nm to about 10 μm; or the mean particle size is about 50 nm to about 500 nm; or the mean particle size is about 50 nm to about 100 nm.

The term "particle size" as used herein means the diameter of the particle if the particle is spherical or, if the particle is non-spherical, the volume-based particle size. The volume-based particle size is the diameter of the sphere that has the same volume as the non-spherical particle in question. Particle size as described herein can be determined by various conventional methods of analysis, such as SEM, TEM, Laser light scattering, laser diffraction, sieve analysis and optical microscopy (usually combined with image analysis).

In one embodiment, the catalyst has a nanoscale particle size. As used herein, a nanoscale particle size refers to populations of nanoparticles having d(0.9) values of 500 nm or less. For example, d(0.9) values of 400 nm or less. For example, d(0.9) values of 300 nm or less. For example, d(0.9) values of 200 nm or less. For example, d(0.9) values of 100 nm or less.

As used herein, "d(0.9)" (which may also be written as "d(v, 0.9)" or volume median diameter) represents the particle size (diameter) for which the cumulative volume of all particles smaller than the d(0.9) value in a population is equal to 90% of the total volume of all particles within that population.

A particle size distribution as described herein (e.g. d(0.9)) can be determined by various conventional methods of analysis, such as Laser light scattering, laser diffraction, sedimentation methods, pulse methods, electrical zone sensing, sieve analysis and optical microscopy (usually combined with image analysis).

In one embodiment, the catalyst has a microscale particle size. As used herein, a nanoscale particle size refers to populations of nanoparticles having d(0.9) values of 500 μm or less. For example, d(0.9) values of 400 μm or less. For example, d(0.9) values of 300 μm or less. For example, d(0.9) values of 200 μm or less. For example, d(0.9) values of 100 μm or less.

In one embodiment, a population of the catalyst of the process have d(0.9) values of about 50 nm to about 10 μm. For example, d(0.9) values of about 50 nm to about 1000 nm. For example, d(0.9) values of about 50 nm to about 900 nm. For example, d(0.9) values of about 50 nm to about 800 nm. For example, d(0.9) values of about 50 nm to about 700 nm. For example, d(0.9) values of about 50 nm to about 600 nm. For example, d(0.9) values of about 50 nm to about 500 nm. For example, d(0.9) values of about 50 nm to about 400 nm. For example, d(0.9) values of about 50 nm to about 300 nm. For example, d(0.9) values of about 50 nm to about 200 nm. For example, d(0.9) values of about 50 nm to about 100 nm.

In addition, to comprising one or more iron species, the catalyst may further comprise a transition metal of the periodic table of elements.

As used herein, the term "transition metal" refers to an element of one of the three series of elements arising from the filling of the 3d, 4d and 5d shells. Unless stated to the contrary, reference to transition metals in general or by use of standard notation of specific transition metals refers to said element in any available oxidation state.

In one embodiment the metal species additionally comprises a transition metal selected from Sc, Y, Ti, Zr, Hf, V, Nb, Ta, Cr, Mo, W, Mn, Tc, Re, Ru, Os, Co, Rh, Ir, Ni, Pd, Pt, Cu, Ag, Au and Zn.

In another embodiment the metal species additionally comprises a transition metal selected from Ti, V, Nb, Ta, Cr, Mo, W, Mn, Tc, Re, Ru, Os, Co, Rh, Ir, Ni, Pd, Pt, Cu, Ag, Au and Zn.

In another embodiment the metal species additionally comprises a transition metal selected from V, Nb, Ta, Cr, Mo, W, Mn, Tc, Re, Ru, Os, Co, Rh, Ir, Ni, Pd, Pt, Cu, Ag, Au and Zn.

In another embodiment, the metal species additionally comprises a transition metal selected from Mn, Ru, Os, Co, Rh, Ir, Ni, Pd, Pt and Cu.

In another embodiment, the metal species additionally comprises a transition metal selected from Mn, Ru, Co, Ni and Cu.

In another embodiment, the metal species additionally comprises a transition metal selected from Mn, Co and Ni.

Suitably, the catalyst additionally comprises a transitional metal in elemental form. As used herein, a transition metal said to be in elemental form or reference to a specific elemental transition metal, refers to said transition metal at an oxidation state of zero.

In one embodiment, the transition metal is not a transition metal oxide.

In one embodiment the catalyst additionally comprises an elemental transition metal selected from Sc, Y, Ti, Zr, Hf, V, Nb, Ta, Cr, Mo, W, Mn, Tc, Re, Ru, Os, Co, Rh, Ir, Ni, Pd, Pt, Cu, Ag, Au and Zn.

In another embodiment the catalyst additionally comprises an elemental transition metal selected from Ti, V, Nb, Ta, Cr, Mo, W, Mn, Tc, Re, Ru, Os, Co, Rh, Ir, Ni, Pd, Pt, Cu, Ag, Au and Zn.

In another embodiment the catalyst additionally comprises an elemental metal selected from V, Nb, Ta, Cr, Mo, W, Mn, Tc, Re, Ru, Os, Co, Rh, Ir, Ni, Pd, Pt, Cu, Ag, Au and Zn.

In another embodiment, the catalyst additionally comprises an elemental metal selected from Mn, Ru, Os, Co, Rh, Ir, Ni, Pd, Pt and Cu.

In another embodiment, the metal species additionally comprises an elemental metal selected from Mn, Ru, Co, Ni and Cu.

In another embodiment, the metal species additionally comprises an elemental metal selected from Mn, Co and Ni.

In another embodiment, the catalyst comprises/essentially consists of/consists of a binary mixture of elemental Fe and elemental Ni (Fe/Ni). Suitably, the two metals are present in a ratio (w/w %) of about 5:1 to 1:5, suitably about 1:1.

In another embodiment, the catalyst comprises/essentially consists of/consists of a binary mixture of elemental Fe and an oxide of Ni (Fe/NiO$_x$). Suitably, the two metals are present in a ratio (w/w %) of about 5:1 to 1:5, suitably about 1:1.

The catalyst employed in the process of the present invention may further comprise alumina (Al$_2$O$_3$). Suitably, the ratio (w/w %) of Fe to Al when the catalyst comprises alumina is about 1:100 to about 100:1.

In one embodiment, the catalyst comprises either elemental iron or an oxide thereof and alumina the ratio (w/w %) of Fe to Al is about 1:3 to about 100:1; more suitably about 1:3 to about 9:1, more suitably about 1:3 to about 4:1

In another embodiment, the catalyst comprises either elemental iron or an oxide thereof and alumina the ratio (w/w %) of Fe to Al is about 1:1 to about 100:1; more suitably about 1:1 to about 9:1, more suitably about 1:1 to about 4:1.

In one embodiment, the catalyst comprises/essentially consists of/consists of elemental Fe and alumina. Suitably, Fe is present in about 40 to about 95 wt. % of the catalyst, suitably about 50 to about 95 wt. % of the catalyst, more suitably about 60 wt. % to about 95 wt. % of the catalyst, more suitably about 70 wt. % to about 95 wt. % of the catalyst.

In one embodiment, the catalyst comprises/essentially consists of/consists of elemental Fe and alumina. Suitably, Fe is present in about 40 to about 75 wt. % of the catalyst, suitably about 50 to about 75 wt. % of the catalyst, more suitably about 60 to about 75 wt. % of the catalyst.

In one embodiment, the catalyst comprises/essentially consists of/consists of iron oxide and alumina. Suitably, Fe is present in about 40 to about 95 wt. % of the catalyst, suitably about 50 to about 95 wt. % of the catalyst, more suitably about 60 to about 95 wt. % of the catalyst, more suitably about 70 to about 95 wt. % of the catalyst.

In one embodiment, the catalyst comprises/essentially consists of/consists of iron oxide and alumina. Suitably, Fe is present in about 40 to about 75 wt. % of the catalyst, suitably about 50 to about 75 wt. % of the catalyst, more suitably about 60 to about 75 wt. % of the catalyst.

In one embodiment, the catalyst comprises/essentially consists of/consists of elemental Fe, alumina and carbon. Suitably, Fe is present in about 40 to about 95 wt. % of the catalyst, suitably about 50 to about 95 wt. % of the catalyst, more suitably about 60 wt. % to about 95 wt. % of the catalyst, more suitably about 70 to about 95 wt. % of the catalyst.

In one embodiment, the catalyst comprises/essentially consists of/consists of elemental Fe, alumina and carbon. Suitably, Fe is present in about 40 to about 75 wt. % of the catalyst, suitably about 50 to about 75 wt. % of the catalyst, more suitably about 60 to about 75 wt. % of the catalyst.

In one embodiment, the catalyst comprises/essentially consists of/consists of iron oxide, alumina and carbon. Suitably, Fe is present in about 40 to about 95 wt. % of the catalyst, suitably about 50 to about 95 wt. % of the catalyst, more suitably about 60 wt to about 95 wt. % of the catalyst, more suitably about 70 wt to about 95 wt. % of the catalyst.

In one embodiment, the catalyst comprises/essentially consists of/consists of iron oxide, alumina and carbon. Suitably, Fe is present in about 40 to about 75 wt. % of the catalyst, suitably about 50 to about 75 wt. % of the catalyst, more suitably about 60 wt to about 75 wt. % of the catalyst.

In one embodiment, the catalyst is selected from Fe—Al$_2$O$_3$, Fe-Al$_2$O$_3$_C, Fe$_2$O$_3$ and Fe$_2$O$_3$_C; wherein _C indicates that the catalyst comprise carbon.

Typically, in the above embodiments where carbon is present, it is present at between about 1 wt. % and 30 wt. % of the total weight of the catalyst, suitably about 1 wt. % to about 10 wt. %, more suitably about 1 wt. % to about 5 wt. %, more suitably about 2 wt. % to about 5 wt. %.

The proportion of the catalyst relative to the total weight solid composition at the start of the process, is typically from 10 wt. % to 60 wt. %. Suitably, from 10 wt. % to 60 wt. %. It may for instance be from 15 wt. % to 60 wt. %, or for instance from 20 wt. % to 60 wt. %. In some embodiments, for instance, it is from 25 wt. % to 60 wt. %, or for instance from 30 wt. % to 60 wt.

In another embodiment, the percentage by weight of the catalyst relative to the total weight solid composition at the start of the process is from 10 wt. % to 50 wt. %. It may for instance be from 15 wt. % to 50 wt. %, or for instance from 20 wt. % to 50 wt. %. In some embodiments, for instance, it is from 25 wt. % to 50 wt. %, or for instance from 30 wt. % to 50 wt. %. Suitably, proportion of the catalyst relative to the total weight solid composition at the start of the process is about 50%.

Solid Composition

The solid composition is in the solid state at standard ambient temperature and pressure (SATP), i.e. at a temperature of 298.15 K (25° C.) and at 100,000 Pa (1 bar, 14.5 psi, 0.9869 atm). In many cases, the composition is also in the solid state under the conditions (i.e. the temperature and pressure) under which the process is carried out.

In one embodiment, the solid composition comprises one or more thermoplastic and thermosetting polymers. In another embodiment, the solid composition comprises/essentially consists of/consists of one or more thermoplastic polymers.

In another embodiment, the solid composition comprises at least about 90 wt. % one or more thermoplastic and thermosetting polymers. In another embodiment, the solid composition comprises at least 90 wt. % of one or more thermoplastic polymers.

In another embodiment, the solid composition comprises at least one thermoplastic polymer selected from polyethylene (PE), polypropylene (PP), polystyrene (PS), polyvinylchloride (PVC), polyamideimide, polymethylmethacrylate (PMMA), polytetrafluoroethylene, polyethylene terephthalate (PET), natural rubber (NR), and polycarbonate (PC), polyvinylidene chloride (PVDC), acrylonitrile butadiene styrene (ABS), polyurethanes (PU).

In one embodiment, the solid composition comprises/essentially consists/consists of one or more thermoplastic polymeric hydrocarbons. Suitably, the solid composition comprises at least 90 wt. % of one or more thermoplastic polymeric hydrocarbons.

In one embodiment, the solid composition comprises/essentially consists/consists of one or more of polyethylene, polypropylene and polystyrene. Suitably, the solid composition comprises at least 90 wt. % of one or more of polyethylene, polypropylene and polystyrene.

In one embodiment, the solid composition consists essentially of shredded waste plastic.

In another embodiment, the solid composition comprises one or more thermoplastic and thermosetting polymers and a catalyst comprising elemental iron (Fe) or an oxide thereof. In this embodiment, the catalyst and the one or more thermoplastic and thermosetting polymers may be processed prior to exposure to electromagnetic radiation in order to provide the solid composition, which may optionally be in powdered or pelleted form.

Suitably, the solid composition may be prepared by intimately mixing the catalyst and the one or more thermoplastic and thermosetting polymers, for instance by granulating, milling or extruding. Suitably, the catalyst is highly dispersed within the polymer.

The proportion of the catalyst relative to the total weight thermoplastic and thermosetting polymer(s) at the start of the process, is typically from 10 wt. % to 60 wt. %. Suitably, from 10 wt. % to 60 wt. %. It may for instance be from 15 wt. % to 60 wt. %, or for instance from 20 wt. % to 60 wt. %. In some embodiments, for instance, it is from 25 wt. % to 60 wt. %, or for instance from 30 wt. % to 60 wt. %.

In another embodiment, the percentage by weight of the catalyst relative to the total weight thermoplastic and thermosetting polymer(s) at the start of the process is from 10 wt. % to 50 wt. %. It may for instance be from 15 wt. % to 50 wt. %, or for instance from 20 wt. % to 50 wt. %. In some embodiments, for instance, it is from 25 wt. % to 50 wt. %, or for instance from 30 wt. % to 50 wt. %. Suitably, proportion of the catalyst relative to the total weight thermoplastic and thermosetting polymer(s) at the start of the process is about 50%.

In one embodiment, the solid composition is substantially free of oxygen. In another embodiment, the solid composition is free of oxygen.

In one embodiment, the solid composition is substantially free of water. In another embodiment, the solid composition is free of water.

In one embodiment, the solid composition is substantially free of oxygenated species and water. In another embodiment, the solid composition is free of oxygenated species and water.

In another aspect, the present invention provides a solid composition comprising a catalyst in admixture with one or more thermoplastic or thermosetting polymers, wherein the catalyst comprises elemental iron (Fe) or an oxide thereof.

Suitably, the catalyst is in intimate admixture with the one or more thermoplastic or thermosetting polymers.

Suitably, the solid composition is in powdered or pelletized form.

With respect to the catalyst, thermoplastic and thermosetting polymer(s) and the features thereof, each of the above described embodiments are equally applicable to this aspect of the invention.

The present invention further relates to the use of the above described solid composition to produce hydrogen; and/or produce syngas; and/or produce carbon nanotubes.

This can be achieved by exposing the solid composition to electromagnetic radiation as described herein.

Electromagnetic Radiation

The electromagnetic radiation that is employed in the process of the invention, in order to recycle the plastic/produce hydrogen/produce syngas/produce carbon nanotubes from the starting material may be radio frequency radiation, microwave frequency radiation, millimetre wave radiation, infrared radiation or UV radiation. A range of electromagnetic frequencies may be used independently, or in combination with one another, to irradiate the sample, including radio frequencies, microwave frequencies, millimetre waves, infrared and UV. Suitably, the radiation is radio or microwave frequency radiation.

Typically, however, the electromagnetic radiation that is employed in the process of the invention is microwave radiation. The term "microwave radiation", as used herein, takes its normal meaning, typically referring to electromagnetic radiation having a wavelength of from one meter to one millimetre, and having a corresponding frequency of from 300 MHz (100 cm) to 300 GHz (0.1 cm).

In one embodiment, the electromagnetic radiation is microwave radiation.

In principle, microwave radiation having any frequency in the microwave range, i.e. any frequency of from 300 MHz to 300 GHz, may be employed in the present invention. Typically, however, microwave radiation having a frequency of from 900 MHz to 4 GHz, or for instance from 900 MHz to 3 GHz, is employed.

In one embodiment, the electromagnetic radiation is microwave radiation having a frequency of from about 1 GHz to about 4 GHz. Suitably, the microwave radiation has a frequency of about 2 GHz to about 4 GHz, suitably about 2 GHz to about 3 GHz, suitably about 2.45 GHz.

In one embodiment, the microwave radiation has a frequency selected from about 915 MHz and about 2.45 GHz.

The power which the electromagnetic radiation needs to delivered to the composition, in order to effect the recycling of plastic/produce hydrogen/produce syngas/produce carbon nanotubes, will vary, according to, for instance, the particular starting material employed in the composition, the particular catalyst employed in the composition, and the size, permittivity, particle packing density, shape and morphology of the composition. The skilled person, however, is readily able to determine a level of incident power which is suitable for effecting the decomposition of a particular composition.

The process of the invention may for example comprise exposing the composition to electromagnetic radiation which delivers a power, per cubic centimetre of the composition, of at least 1 Watt. It may however comprise exposing the composition to electromagnetic radiation which delivers a power, per cubic centimetre of the composition, of at least 5 Watts.

Often, for instance, the process comprises exposing the composition to electromagnetic radiation which delivers to the composition a power of at least 10 Watts, or for instance at least 20 Watts, per cubic centimetre of the composition. The process of the invention may for instance comprise exposing the composition to electromagnetic radiation which delivers to the composition at least 25 Watts per cubic centimetre of the composition.

Often, for instance, the process comprises exposing the composition to electromagnetic radiation which delivers a power of from about 0.1 Watt to about 5000 Watts per cubic centimetre of the composition. More typically, the process comprises exposing the composition to electromagnetic radiation which delivers a power of from about 0.5 Watts to about 1000 Watts per cubic centimetre of the composition, or for instance a power of from about 1 Watt to about 500 Watts per cubic centimetre of the composition, such as, for instance, a power of from about 1.5 Watts to about 200 Watts, or say, from 2 Watts to 100 Watts, per cubic centimetre of the composition.

In some embodiments, for instance the process comprises exposing the composition to electromagnetic radiation which delivers to the composition from about 5 Watts to about 100 Watts per cubic centimetre of the composition, or for instance from about 10 Watts to about 100 Watts per cubic centimetre, or for instance from about 20 Watts, or from about 25 Watts, to about 80 Watts per cubic centimetre of the composition.

In some embodiments, for instance, the process comprises exposing the composition to electromagnetic radiation which delivers a power of from about 2.5 to about 60 Watts per cubic centimetre of the composition. Thus, for example, if the volume of the composition is 3.5 cm3, the process of the invention typically comprises exposing the composition to electromagnetic radiation which delivers about 10 W to about 200 W to the composition (i.e. the "absorbed power" is from about 10 W to about 200 V.

Often, the power delivered to the composition (or the "absorbed power") is ramped up during the process of the invention. Thus, the process may comprise exposing the composition to electromagnetic radiation which delivers a first power to the composition, and then exposing the composition to electromagnetic radiation which delivers a second power to the composition, wherein the second power is greater than the first. The first power may for instance be from about 2.5 Watts to about 6 Watts per cubic centimetre of the composition. The second power may for instance be from about 25 Watts to about 60 Watts per cubic centimetre of the composition. Often in these embodiments, the electromagnetic radiation is microwave radiation, which may be as further defined hereinbefore.

The duration of exposure of the composition to the electromagnetic radiation may also vary in the process of the invention. Embodiments are, for instance, envisaged wherein a given composition is exposed to electromagnetic radiation over a relatively short period of time, to effect recycling of the plastic/production of hydrogen/production of syngas/production of carbon nanotubes. For instance, the solid composition may be irradiated with microwaves for a period of about 1 second to about 3 hours.

In some embodiments, exposing the composition to the electromagnetic radiation causes the composition to be heated. Electromagnetic heating provides a method of fast, selective heating of dielectric and magnetic materials. Rapid and efficient heating using microwaves is an example in which inhomogeneous field distributions in dielectric mixtures and field-focussing effects can lead to dramatically different product distributions. The fundamentally different mechanisms involved in electromagnetic heating may cause enhanced reactions and new reaction pathways. Furthermore, the high fields involved can modify catalyst work functions and can lead to the production of plasmas at the catalyst surface, further shifting the character of the chemical processes involved.

In one embodiment, the process of the invention comprises heating said composition by exposing the composition to the electromagnetic radiation, suitably microwave radiation.

Microwave Reactor

In another aspect, the present invention relates to a microwave reactor comprising solid composition, said mixture comprising a catalyst in intimate mixture with one or more thermoplastic or thermosetting polymers, wherein the catalyst comprises elemental iron (Fe) or an oxide thereof.

With respect to the solid catalyst, composition and the features thereof, each of the above described embodiments are equally applicable to this aspect of the invention.

Typically, the reactor is configured to receive the composition to be exposed to radiation. The reactor typically therefore comprises at least one vessel configured to comprise the composition. The composition may have been provided via an inlet to the vessel. The vessel may be located in a reaction cavity, said cavity being the focus of the microwave radiation.

The reactor may be also configured to export hydrogen. Thus, the reactor typically comprises an outlet through which hydrogen gas, generated in accordance with the process of the invention, may be released or collected.

In some embodiments, the microwave reactor is configured to subject the composition to electric fields in the TM010 mode.

EXAMPLES

1. Microwave-Initiated Polyethylene (PE) Dehydrogenation

The catalyst was synthesised by directly calcining a mixture of $Fe(NO_3)_3 \cdot 9H_2O$, $Al(NO_3)_3 \cdot 9H_2O$ and citric acid at 350° C. for 3 hours to give FeOx·Al2O3_C (the suffix _C indicates that carbon is present by virtue of adding citric acid when preparing the catalysts). The amount of each component was calculated in order to produce the desired catalyst with the indicated ratio of components. The final carbon content was characterised by temperature programme oxidation via thermogravimetric analysis (TGA, TA Instrument, SDT Q-600).

Polyethylene (PE) was used as supplied from Sigma-Aldrich without further treatment.

The PE powder was physically mixed by mortar and pestle or by blender with catalysts in a weight ratio of 1:1 and then filled in a quartz tube. The sample was then exposed to 750 W microwave irradiation and the generated gases were collected and analysed by GC. The microwave system consisted of a microwave generation system, a microwave cavity and a control system. The system was computer controlled using the Labview software. The operating frequency was 2450 MHz (±25 MHz) from 10% to 100% of nominal power).

A successive cycle of tests was carried out to investigate the durability and the catalytic activity of catalysts towards the effect of carbon deposition.

The mass of each gas was calculated according to the volume content from GC analysis and the mass of produced gas and $H_2$ (gas and $H_2$ yield) were calculated as following Eq. 1 and Eq. 2, respectively. The mass of carbon generation (carbon yield) was determined as the mass of carbon in the spent catalysts in relation to the total weight of PE, which the carbon content was determined by temperature programme oxidation (TPO) (Eq. 3).

$$\text{Mass of Gas generation(Gas yield)} = \frac{\text{Mass of Gas}}{\text{Mass of } PE}(\text{wt. \%}) \quad \text{Eq. 1}$$

$$\text{Mole of } H_2 \text{ generation}(H_2 \text{ yield}) = \frac{\text{Mole of } H_2(\text{mmol})}{\text{Mass of } PE(g)} \quad \text{Eq. 2}$$

$$\text{Mass of carbon production(Carbon yield)} = \frac{\text{Mass of carbon(mg)}}{\text{Mass of } PE(g)} \quad \text{Eq. 3}$$

FIG. 1 and Table 1 illustrate the evolved gas composition from polyethylene (PE) dehydrogenation over the FeOx·Al$_2$O$_3$_C (Fe 74.4 wt. %; Al 28.6 wt. %; C 2 wt. %) catalyst. A considerable amount of hydrogen was readily extracted from PE, typically in periods of about 1 minute. In addition, a selectivity of nearly 80% for hydrogen was obtained in the exiting gas stream. About 10% of CO was observed due to the use of iron oxide as a catalyst. Through the successive cycle of tests, the concentration of H$_2$ and CO decreased, with a corresponding increase of CH$_4$, C$_2$H$_4$ and other small hydrocarbons. However, the catalyst system is shown to function efficiently in the deep dehydrogenation of PE for several catalytic cycles through successive additional mix of PE with spent catalysts.

TABLE 1

GC analysis of evolved gas composition (vol. %) of PE dehydrogenation over FeOx•Al$_2$O$_3$_C (Fe 74.4 wt. %; Al 28.6 wt. %, C 2 wt %) catalyst.

| Test No. | H$_2$ | CH$_4$ | C$_2$H$_4$ | C$_2$-C$_5$ | CO$_2$ | CO |
|---|---|---|---|---|---|---|
| Cycle 1 | 79.6 | 5.5 | 1.2 | 0.9 | 1.4 | 11.4 |
| Cycle 2 | 83.3 | 3.9 | 1.5 | 3.1 | 0.8 | 7.4 |
| Cycle 3 | 77.0 | 10.5 | 5.1 | 3.7 | 0.3 | 3.4 |
| Cycle 4 | 70.1 | 15.1 | 8.2 | 4.4 | 0.2 | 2.0 |
| Cycle 5 | 65.7 | 17.1 | 9.6 | 5.1 | 0.1 | 2.3 |
| Cycle 6 | 52.6 | 21.9 | 16.6 | 6.9 | 0.2 | 1.8 |
| Cycle 7 | 42.7 | 31.8 | 14.4 | 9.6 | 0.1 | 1.3 |

Figure 2:
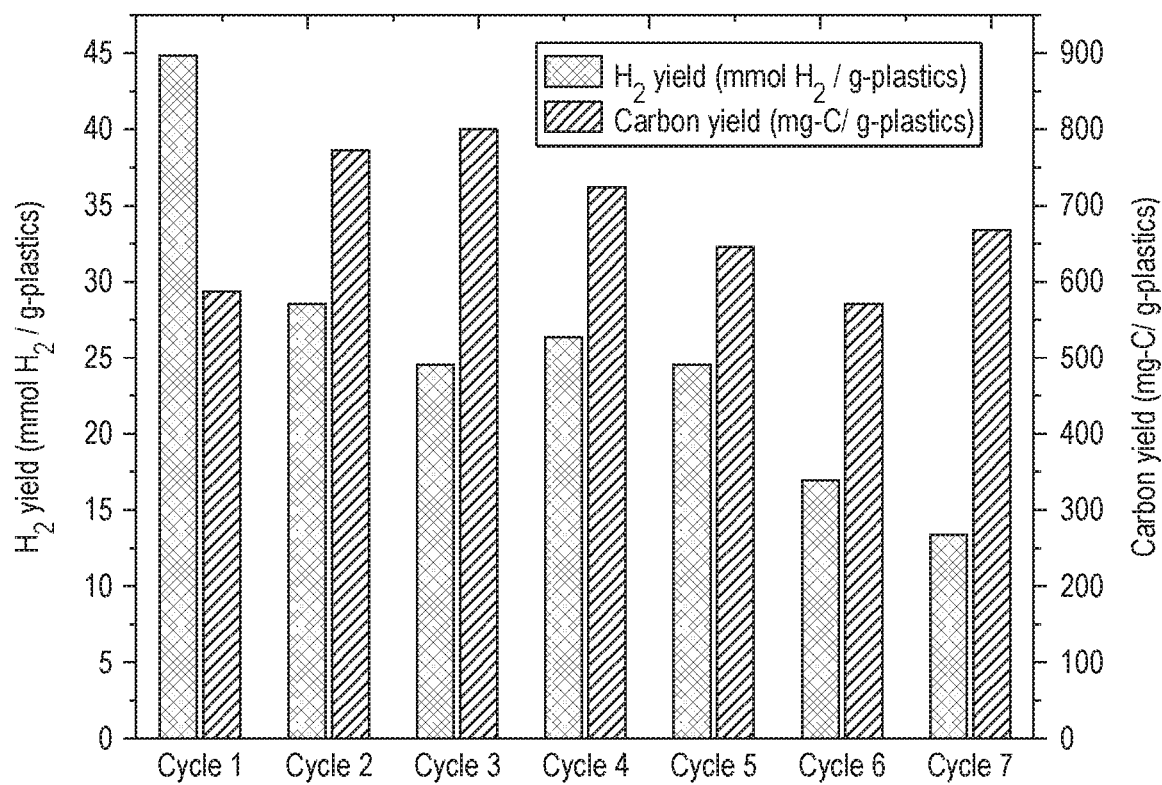
FIG. 2 shows hydrogen yield and carbon yield through the successive cycles of PE dehydrogenation over FeOx·Al$_2$O$_3$_C (Fe 74.4 wt. %; Al 28.6 wt. %) catalyst.

The H$_2$ yield and carbon yield are given in FIG. 2 and the experimental results are summarised in Table 2.

TABLE 2

Summary of experimental results of PE dehydrogenation over FeOx•Al$_2$O$_3$_C (Fe 74.4 wt. %; Al 28.6 wt. %, C 2 wt %) catalyst.

| Test No. | Gas volume (mL) | H$_2$ yield (mmol H$_2$/g-plastics) | Carbon yield (mg-C/g-plastics) | Gas yield (wt. %) | Carbon deposition (wt. %) | Mass balance |
|---|---|---|---|---|---|---|
| Cycle 1 | 650 | 44.8 | 584.2 | 39.29 | 58.42 | 97.7 |
| Cycle 2 | 350 | 28.5 | 771.8 | 22.06 | 77.18 | 99.2 |
| Cycle 3 | 250 | 24.5 | 801.5 | 22.74 | 80.15 | 102.9 |
| Cycle 4 | 250 | 26.3 | 723.2 | 31.92 | 72.32 | 104.2 |
| Cycle 5 | 250 | 24.6 | 645.3 | 35.38 | 64.53 | 99.9 |
| Cycle 6 | 220 | 16.9 | 571.3 | 40.00 | 57.13 | 97.1 |
| Cycle 7 | 210 | 13.3 | 666.9 | 42.92 | 66.69 | 109.6 |

The mass balance for each cycle of tests ranged from 97.7 to 109.6 wt. %, indicating the reliability of experiments. The highest H$_2$ yield was obtained at cycle 1 with 44.8 mmol of H$_2$ was extracted from 1.0 g of PE. The H$_2$ yield was then decreased to about 24-28 mmol/g-PE and remaining stable between cycle 2 to cycle 5. The H$_2$ yield was found again decreased at cycle 6 and cycle 7, but the gas yield remained 40 wt. % which indicated the catalysts were still highly active towards PE dehydrogenation.

Figure 3:
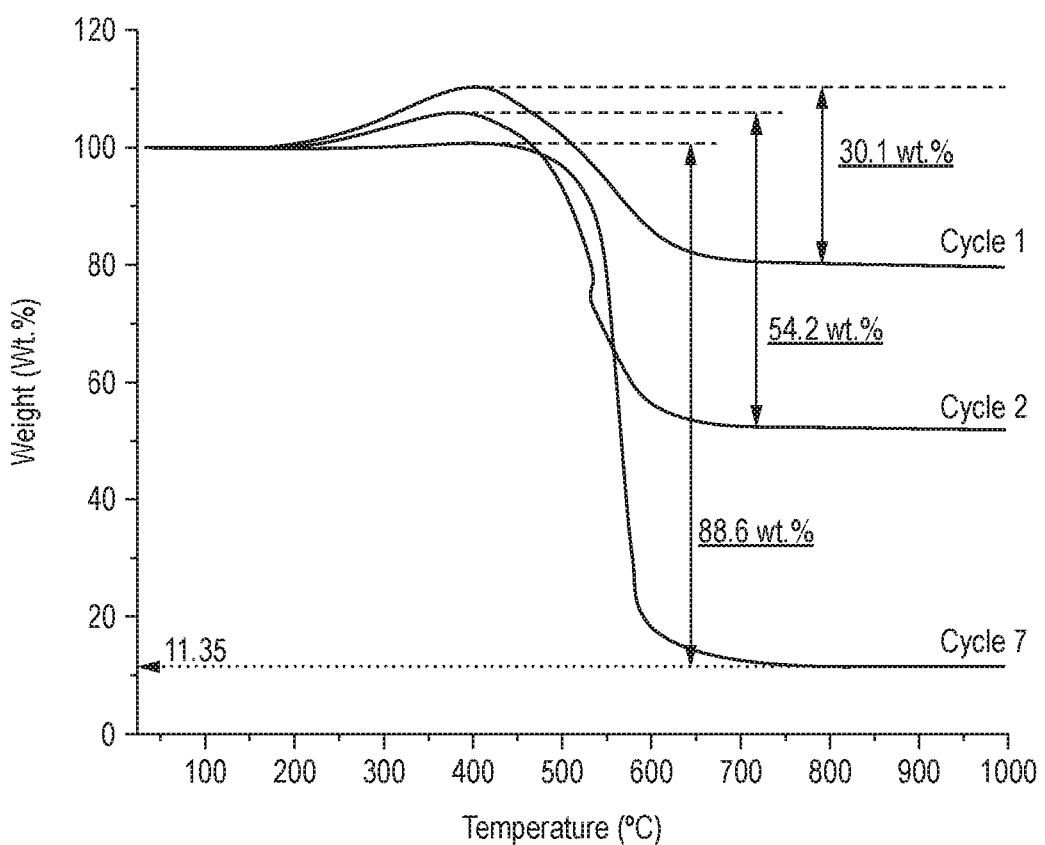
FIG. 3 shows thermogravimetric analysis (TGA) on spent FeOx·Al$_2$O$_3$_C (Fe 74.4 wt. %; Al 28.6 wt. %) catalyst through the successive cycles of PE dehydrogenation.

In addition, nearly 570 to 800 mg of carbon was produced from 1 g of PE at each cycle. According to the thermogravimetric analysis (TGA), the catalysts remained active after 7 cycles of test with 9 times weight of carbon accumulated (FIG. 3). Thus, it is estimated that 1 g of FeOx·Al$_2$O$_3$_C (Fe 74.4 wt. %; Al 28.6 wt. %, C 2 wt %) catalyst could dehydrogenate over 10.5 g PE and generate more than 9066 mL H$_2$.

Figure 4A:
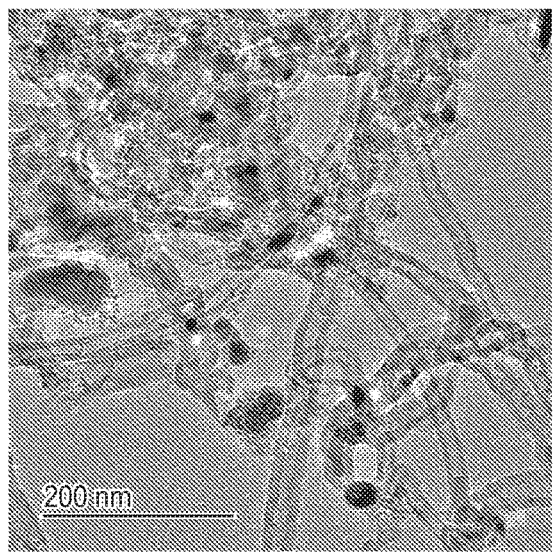
FIG. 4A shows transmission electron microscopy (TEM) images of spent FeOx·Al$_2$O$_3$_C (Fe 74.4 wt. %; Al 28.6 wt. %) catalyst. (A, B) samples after first cycle of experiments, (C, D) samples after 7 cycles.
Figure 4A:
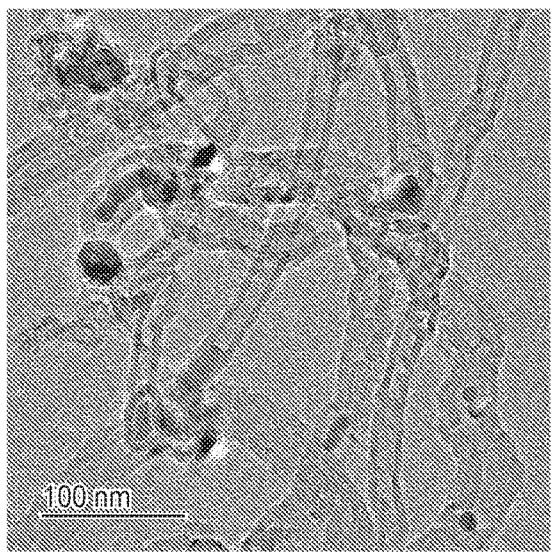
Figure 4A:
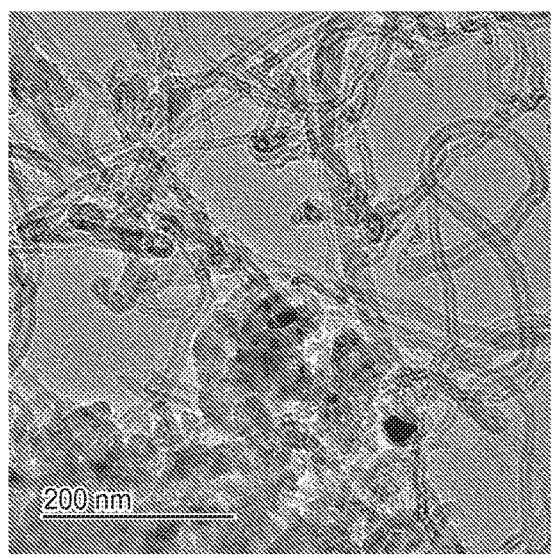
Figure 4A:
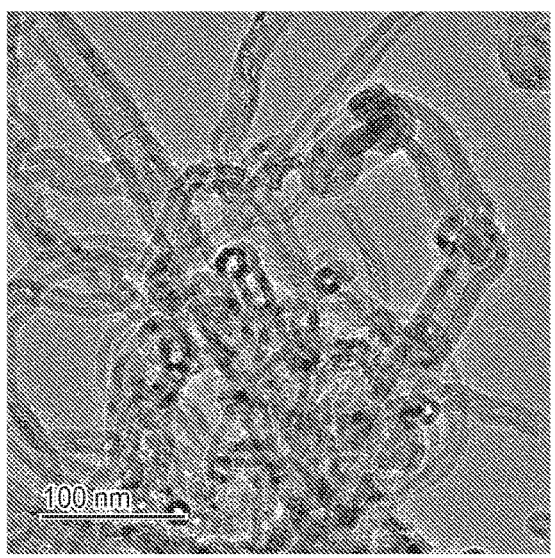
Figure 4B:
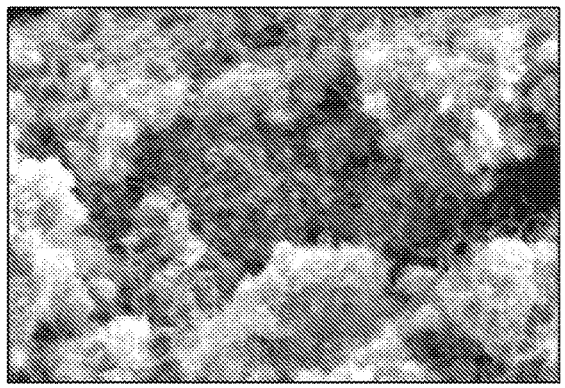
FIG. 4B shows scanning electron microscopy (SEM) images of synthesised carbon nanotubes after 10 cycles of experiments.
Figure 4B:
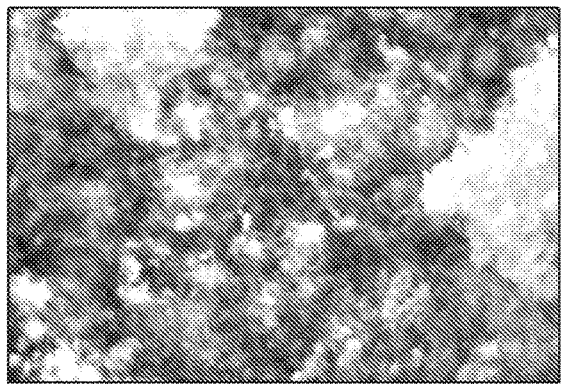
Figure 4B:
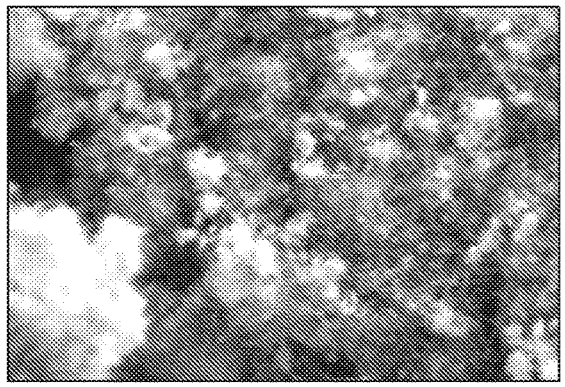
Figure 4B:
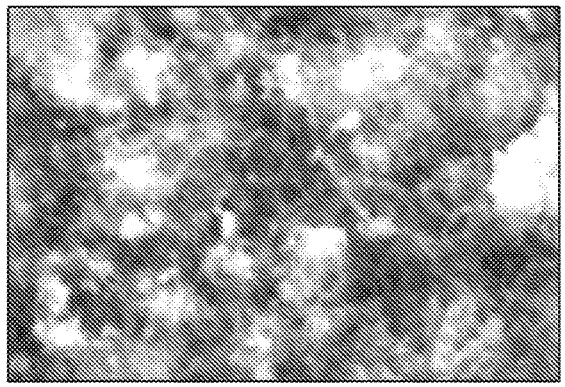

Analysis of the spent catalysts via transmission electron microscopy (TEM) images showed the generation of carbon nanotubes (FIG. 4A). The carbon nanotubes were also characterised by scanning electron microscopy (SEM) which showed generation of carbon nanotubes (FIG. 4B).

2. Microwave-Initiated Dehydrogenation Polyethylene (PE), Polypropylene (PP) and Polystyrene (PS)

All polymers were obtained from Sigma-Aldrich and the polyethylene (PE) was used as supplied without further treatment. The polypropylene (PP) and Polystyrene (PS) pellets were ground into smaller particles.

The plastic feedstocks were physically mixed with FeOx·Al2O3_C (Fe 74.4 wt. %; Al 28.6 wt. %, C 2 wt %) catalyst in a weight ratio of 1:1 and then the solid composition filled into a quartz tube. The sample was then exposed to 750 W microwave irradiation and the generated gases were collected and analysed by GC. In order to simulate the real waste plastics, a mixture of PE, PP and PS were prepared with a composition of 75 wt. % PE, 20 wt. % PP and 5 wt. % PS.

Figure 5:
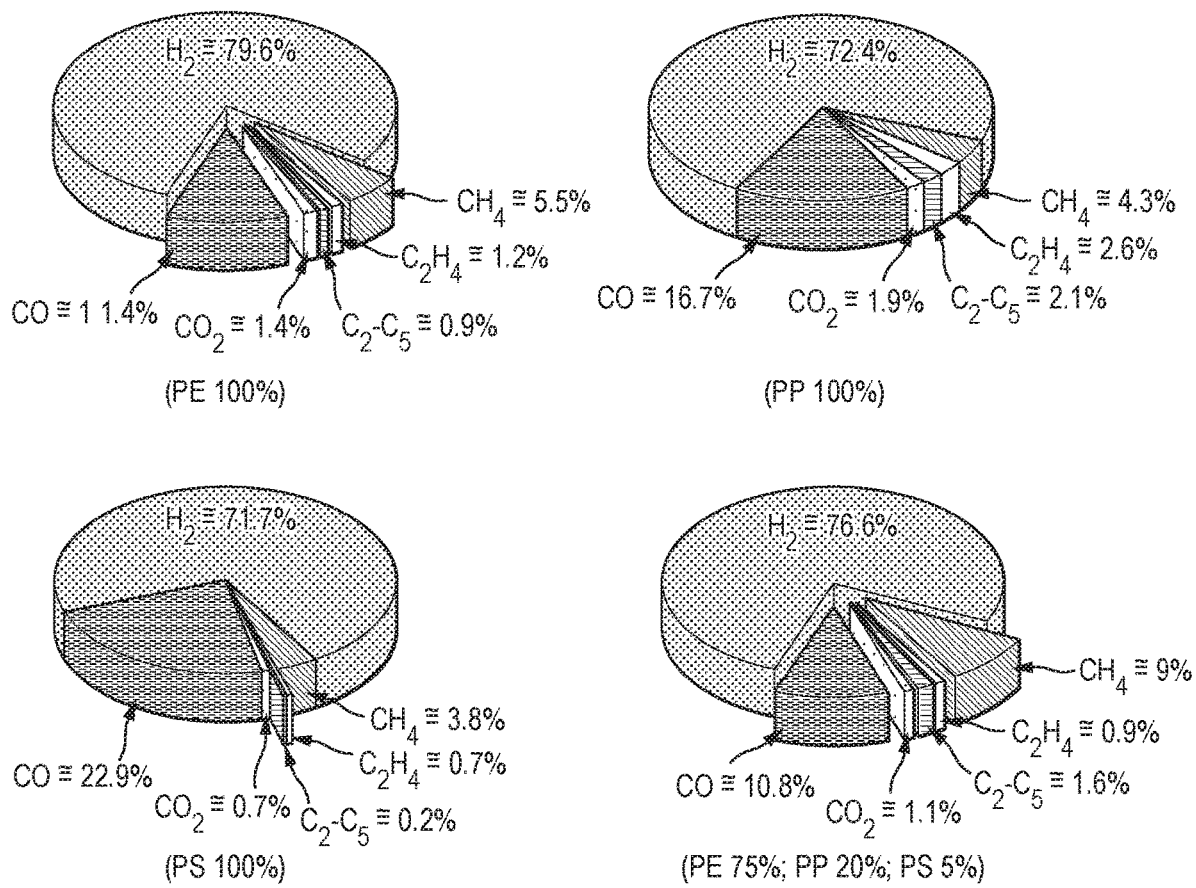
FIG. 5 shows evolved gas composition (vol. %) of PE, PP, PS and PE:PP:PS (75:20:5) mixture in dehydrogenation over FeOx·Al$_2$O$_3$_C (Fe 74.4 wt. %; Al 28.6 wt. %) catalyst.

Again, hydrogen was rapidly extracted from all three polymeric hydrocarbons as well as the modelled waste plastic in about 1 minute with a hydrogen concentration of ca. 75 vol. % in the effluent gases (FIG. 5). CO was still the major by-product which accounted for about 10 to 20% of exiting gas stream. The catalyst system shows similar highly efficient catalytic active towards different plastic feedstocks.

Figure 6:
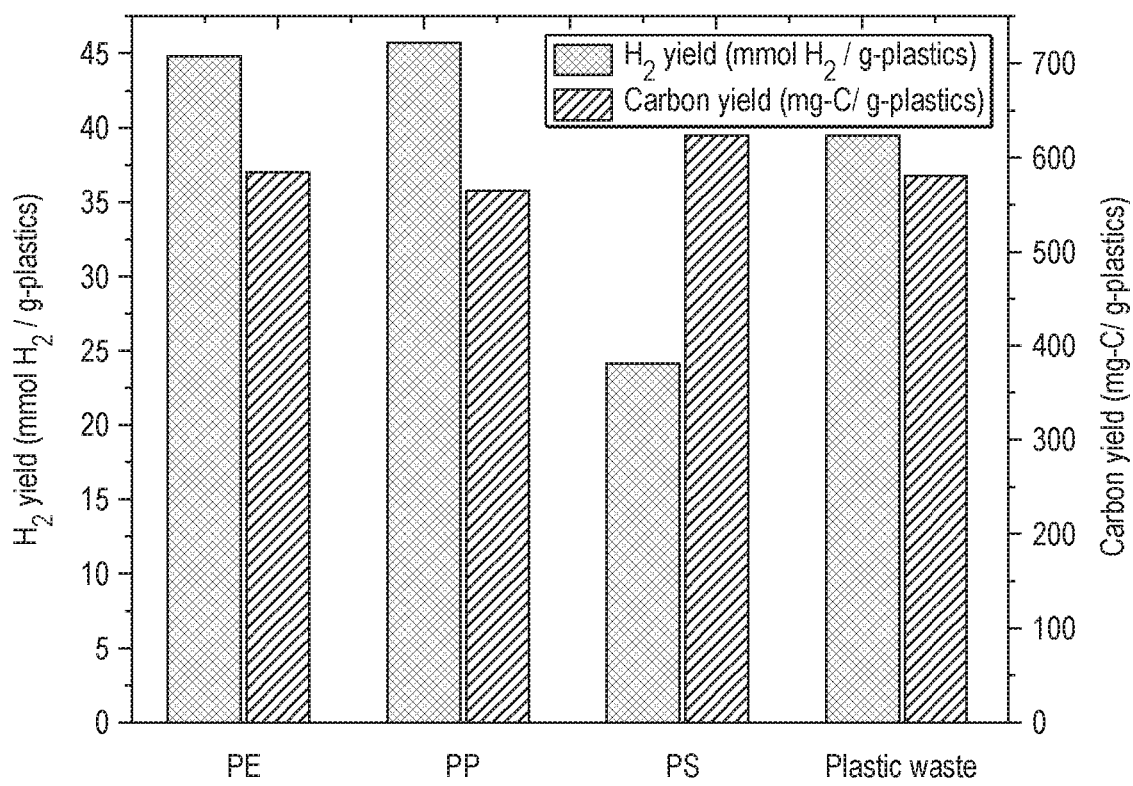
FIG. 6 shows hydrogen yield and carbon yield of polyethylene (PE), polypropylene (PP), polystyrene (PS) and modelled plastic waste via microwave-initiated dehydrogenation over FeOx·Al$_2$O$_3$_C (Fe 74.4 wt. %; Al 28.6 wt. %) catalyst. A mixture of 75 wt. % PE, 20 wt. % PP and 5 wt. % PS was prepared to simulate the mixed plastic waste.

The hydrogen yield of PE, PP, PS and modelled plastic waste are 44.8, 45.7, 24.1 and 39.4 mmol/g-plastic respectively (Table 3). And the carbon yield of PE, PP, PS and modelled plastic waste are 364.1, 402.2, 458.0, and 547.9 mg-C/g-plastics, respectively. The mass balance for all the samples are reliable, ranging from 92.6 to 108.2 wt. % (FIG. 6).

TABLE 3

Summary of experimental results of polyethylene (PE), polypropylene (PP), polystyrene (PS) and modelled plastic waste dehydrogenation FeOx•Al$_2$O$_3$_C (Fe 74.4 wt. %; Al 28.6 wt. %, C 2 wt %) catalyst.

| Plastics | Gas volume (mL) | H$_2$ yield (mmol H$_2$/g-plastics) | Carbon yield (mg-C/g-plastics) | Gas yield (wt. %) | Carbon deposition (wt. %) | Mass balance |
|---|---|---|---|---|---|---|
| PE | 650 | 44.8 | 584.2 | 39.29 | 58.42 | 97.7 |
| PP | 700 | 45.7 | 563.6 | 43.93 | 56.36 | 100.3 |
| PS | 350 | 24.1 | 622.8 | 30.37 | 62.28 | 92.6 |
| Plastic waste | 600 | 39.4 | 579.7 | 50.25 | 57.97 | 108.2 |

Figure 7:
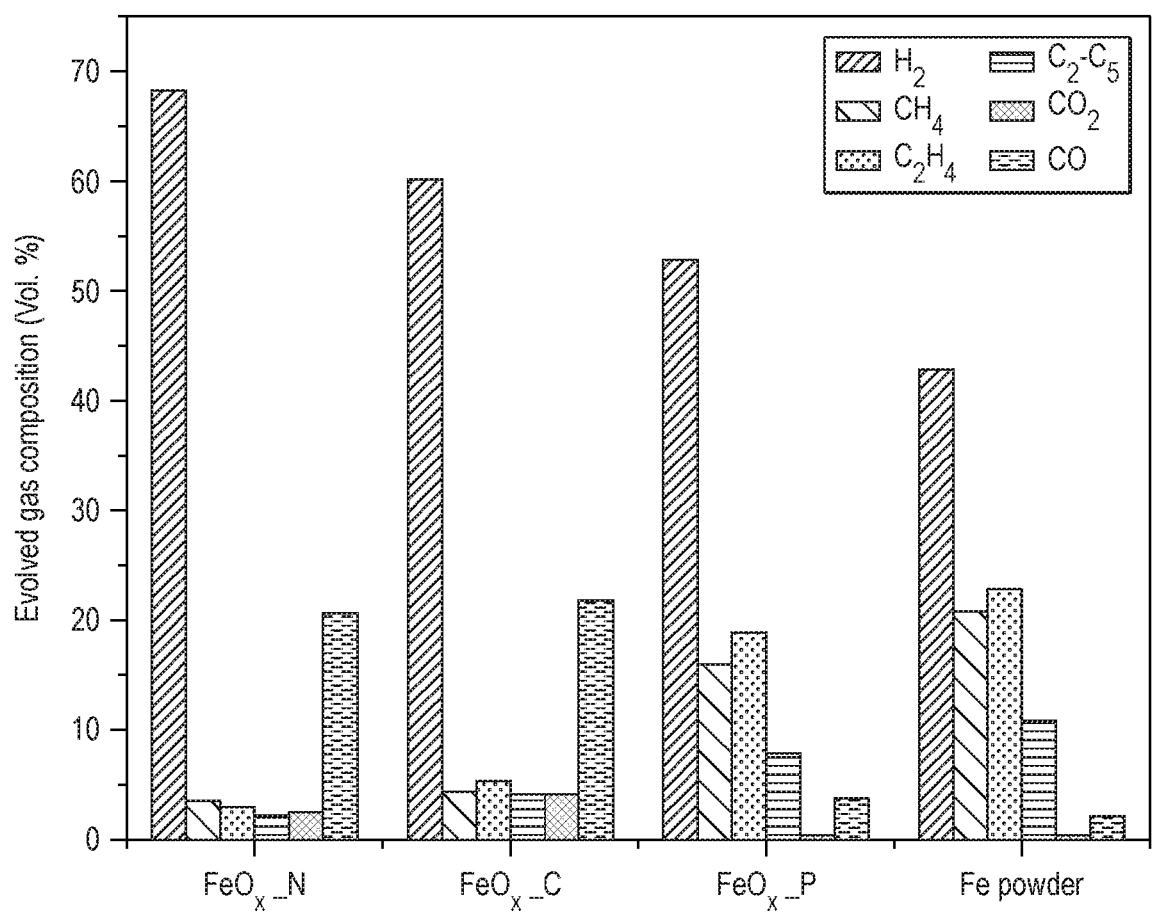
FIG. 7 shows the evolved gas composition (vol. %) of PE dehydrogenation over various FeO$_x$ and Fe catalysts.

3. Comparison of FeO$_x$ and Fe as Catalysts for Polyethylene (PE) Dehydrogenation Various iron oxides (FeO$_x$) were prepared and tested towards polyethylene (PE) dehydrogenation under microwave irradiation (FIG. 7). The catalyst designated FeOx_N catalyst was prepared by directly calcinating Fe(NO$_3$)$_3$·9H$_2$O at 350° C. for 3 h, FeOx_C catalyst was obtained from the calcination of the mixture of Fe(NO$_3$)$_3$·9H$_2$O and citric acid and FeOx_P catalyst was directly calcinated from Fe powder. The Fe powder was used as it was supplied from Sigma-Aldrich.

It can be seen that FeO$_x$ has higher catalytic activity than Fe powder towards PE dehydrogenation. Higher selectivity to hydrogen was obtained over FeO$_x$ and more methane and ethylene were produced over Fe powder. It should be noted that the FeOx_P, which prepared by calcinating from Fe powder at 350° C. has similar performance with Fe powder in terms of catalytic activity and product profile, perhaps due to insufficient oxidation.

The hydrogen yield for FeOx_N and FeOx_C was 42.2 and 26.5 mmol/g-plastic, respectively. A yield of 12.1 and 9.0 mmol/g-plastic of hydrogen was obtained over FeOx_P and Fe powder respectively (Table 4).

TABLE 4

Summary of experimental results of polyethylene (PE) dehydrogenation comparing FeOx and Fe catalyst.

| Catalysts | Gas volume (mL) | H$_2$ yield (mmol H$_2$/g-plastics) | Carbon yield (mg-C/g-plastics) | Gas yield (wt. %) | Carbon deposition (wt. %) | Mass balance |
|---|---|---|---|---|---|---|
| FeOx_N | 700 | 42.2 | 364.1 | 65.06 | 36.41 | 101.5 |
| FeOx_C | 450 | 26.5 | 402.2 | 57.51 | 40.22 | 97.7 |
| FeOx P | 260 | 12.1 | 458.0 | 30.61 | 45.80 | 76.4 |
| Fe powder | 270 | 9.0 | 547.9 | 32.97 | 54.79 | 87.8 |

4. Optimisation of the Catalyst

The catalysts were investigated by varying several parameters, including changing the Fe/Al ratios, adding citric acid when preparing catalysts, adding other metals (Ni, Co, Mn etc.) as additives and varying the weight ratio of plastic and catalyst mixtures.

Plastics (Polyethylene (PE); Polypropylene (PP); Polystyrene (PS)) and catalysts were physically mixed in a weight ratio of 1:1 unless otherwise specified. The mixture was exposed to 750 W microwave irradiation and the generated gases were collected and analysed by GC.

The results are summarised in Table 6 and Table 7. Catalysts with a suffix of '_C' indicate the catalysts were prepared by adding citric acid as additive and comprise up to 5% carbon. * Catalysts with a suffix of '_reduced' indicates that the catalysts were reduced with a H$_2$/Ar stream at 700° C. for 6 hours

TABLE 6

Gas composition (vol. %) over various catalysts.

| Sample | H$_2$ | CH$_4$ | C$_2$H$_4$ | C$_2$-C$_5$ | CO$_2$ | CO |
|---|---|---|---|---|---|---|
| PE + FeOx—Al2O3_C** (Fe 71.4 wt. %; Al 28.6 wt. %; Citric acid) Cycle 1 | 79.6 | 5.5 | 1.2 | 0.9 | 1.4 | 11.4 |
| PE + FeOx—Al2O3_C (Fe 71.4 wt. %; Al 28.6 wt. %; Citric acid) Cycle 2 | 83.3 | 3.9 | 1.5 | 3.1 | 0.8 | 7.4 |
| PE + FeOx—Al2O3_C (Fe 71.4 wt. %; Al 28.6 wt. %; Citric acid) Cycle 3 | 77.0 | 10.5 | 5.1 | 3.7 | 0.3 | 3.4 |
| PE + FeOx—Al2O3_C (Fe 71.4 wt. %; Al 28.6 wt. %; Citric acid) Cycle 4 | 70.1 | 15.1 | 8.2 | 4.4 | 0.2 | 2.0 |
| PE + FeOx—Al2O3_C (Fe 71.4 wt. %; Al 28.6 wt. %; Citric acid) Cycle 5 | 65.7 | 17.1 | 9.6 | 5.1 | 0.1 | 2.3 |
| PE + FeOx—Al2O3_C (Fe 71.4 wt. %; Al 28.6 wt. %; Citric acid) Cycle 6 | 52.6 | 21.9 | 16.6 | 6.9 | 0.2 | 1.8 |
| PE + FeOx—Al2O3_C (Fe 71.4 wt. %; Al 28.6 wt. %; Citric acid) Cycle 7 | 42.7 | 31.8 | 14.4 | 9.6 | 0.1 | 1.3 |
| PP + FeOx—Al2O3_C (Fe 71.4 wt. %; Al 28.6 wt. %; Citric acid) | 76.6 | 9.0 | 0.9 | 1.6 | 1.1 | 10.8 |
| PS + FeOx—Al2O3_C (Fe 71.4 wt. %; Al 28.6 wt. %; Citric acid) | 71.7 | 3.8 | 0.7 | 0.2 | 0.7 | 22.9 |
| PE + FeOx—Al2O3 (Fe 60 wt. %; Al 40 wt. %) | 62.5 | 16.3 | 8.5 | 2.2 | 1.0 | 9.5 |
| PE + FeOx—Al2O3_C (Fe 71.4 wt. %; Al 28.6 wt. %; Citric acid) | 75.8 | 4.0 | 2.6 | 1.4 | 1.5 | 14.7 |
| PE + FeOx—Al2O3_C (Fe 71.4 wt. %; Al 28.6 wt. %; Citric acid) reduced*** | 79.2 | 4.5 | 3.2 | 2.4 | 0.4 | 10.3 |
| PP + FeOx—Al2O3_C_reduced (Fe 71.4 wt. %; Al 28.6 wt. %; Citric acid) | 72.2 | 7.1 | 3.0 | 7.3 | 0.4 | 10.0 |
| PE (75 wt. %) + FeOx—Al2O3_C (Fe 71.4 wt. %; Al 28.6 wt. %; Citric acid) | 66.6 | 16.4 | 7.0 | 3.7 | 1.2 | 5.0 |

TABLE 6-continued

Gas composition (vol. %) over various catalysts.

| Sample | $H_2$ | $CH_4$ | $C_2H_4$ | $C_2$-$C_5$ | $CO_2$ | CO |
|---|---|---|---|---|---|---|
| PE (30 wt. %) + FeOx—Al2O3_C (Fe 71.4 wt. %; Al 28.6 wt. %; Citric acid) | 68.1 | 3.4 | 1.0 | 1.1 | 4.3 | 22.1 |
| PE + Fe—Al2O3_C_reduced (Fe 81.3 wt. %; Al 18.7 wt. %; Citric acid) | 49.5 | 11.6 | 16.8 | 8.0 | 0.5 | 13.6 |
| PE + Fe/AC | 62.3 | 20.7 | 5.9 | 3.7 | 0.2 | 7.2 |
| PE + Fe/SiC | 42.1 | 24.5 | 24.9 | 6.1 | 0.1 | 2.3 |
| PE + FeNiOx—Al2O3—C (Fe 37.5 wt. %; Ni 37.5 wt. %; Al 25 wt. %; Citric acid) | 72.7 | 13.1 | 1.6 | 1.5 | 2.0 | 9.1 |
| PE + Fe—Al2O3_C_ reduced (Fe 60 wt. %; Al 40 wt. %) | 52.3 | 12.9 | 21.0 | 6.9 | 0.5 | 6.4 |
| PE + $CH_4$ pre-treated Fe—Al2O3—C (Fe 71.4 wt. %; Al 28.6 wt. %; Citric acid) | 51.4 | 15.4 | 19.6 | 10.2 | 0.8 | 2.6 |
| PE + Fe2O3—C (Fe 100%; Citric acid) | 60.1 | 4.4 | 5.4 | 4.1 | 4.1 | 21.8 |
| PE + FeOx—Al2O3_C (Fe 60 wt. %; Al 40 wt. %; Citric acid) | 75.1 | 4.3 | 0.9 | 1.4 | 2.3 | 16.0 |
| PE + FeOx—Al2O3—C (Fe 50%; Al 50%; Citric acid) | 62.2 | 10.9 | 5.8 | 2.5 | 1.7 | 16.8 |
| PE + Fe2O3 | 68.3 | 3.5 | 2.9 | 2.2 | 2.5 | 20.6 |
| Plastics mixtures (PE 75%; PP 20%; PS 5%) + FeOx—Al2O3—C (Fe 71.4 wt. %; Al 28.6 wt. %; Citric acid) | 72.4 | 4.3 | 2.6 | 2.1 | 1.9 | 16.7 |
| PE + Fe—Co—Mn—Na | 68.0 | 9.3 | 6.9 | 3.9 | 1.0 | 10.9 |
| PE + Fe | 42.9 | 20.8 | 22.8 | 10.9 | 0.4 | 2.2 |
| PE + FeOx—Al2O3—C (95% Fe powder + 5% Al($NO_3$)$_3$ + citric acid) | 66.6 | 10.1 | 6.2 | 2.8 | 0.7 | 13.5 |
| PE + FeOx – Fe from iron powder | 52.8 | 16.0 | 19.0 | 8.0 | 0.3 | 3.9 |
| PE + FeOx—Al2O3—C (Fe 90% + Al 10% + citric acid) | 76.3 | 4.9 | 1.5 | 1.0 | 1.5 | 14.7 |
| PE + FeOx—Al2O3—C (Fe 50%; Al 50%; Citric acid) | 53.1 | 18.5 | 17.5 | 6.9 | 0.1 | 3.9 |

TABLE 7

$H_2$ yield and mass balance over various catalysts.

| Sample | Gas volume (mL) | $H_2$ yield (mmol $H_2$/g-plastics) | Carbon yield (mg-C/g-plastics) | gas yield (wt. %) | Carbon deposition (wt. %) | Mass balance |
|---|---|---|---|---|---|---|
| PE + FeOx—Al2O3_C (Fe 71.4 wt. %; Al 28.6 wt. %; Citric acid) Cycle 1 | 650 | 44.8 | 584.2 | 39.29 | 58.42 | 97.7 |
| PE + FeOx—Al2O3_C (Fe 71.4 wt. %; Al 28.6 wt. %; Citric acid) Cycle 2 | 350 | 28.5 | 771.8 | 22.06 | 77.18 | 99.2 |
| PE + FeOx—Al2O3_C (Fe 71.4 wt. %; Al 28.6 wt. %; Citric acid) Cycle 3 | 250 | 24.5 | 801.5 | 22.74 | 80.15 | 102.9 |
| PE + FeOx—Al2O3_C (Fe 71.4 wt. %; Al 28.6 wt. %; Citric acid) Cycle 4 | 250 | 26.3 | 723.2 | 31.92 | 72.32 | 104.2 |
| PE + FeOx—Al2O3_C (Fe 71.4 wt. %; Al 28.6 wt. %; Citric acid) Cycle 5 | 250 | 24.6 | 645.3 | 35.38 | 64.53 | 99.9 |
| PE + FeOx—Al2O3_C (Fe 71.4 wt. %; Al 28.6 wt. %; Citric acid) Cycle 6 | 220 | 16.9 | 571.3 | 40.00 | 57.13 | 97.1 |
| PE + FeOx—Al2O3_C (Fe 71.4 wt. %; Al 28.6 wt. %; Citric acid) Cycle 7 | 210 | 13.3 | 666.9 | 42.92 | 66.69 | 109.6 |
| PP + FeOx—Al2O3_C (Fe 71.4 wt. %; Al 28.6 wt. %; Citric acid) | 700 | 45.7 | 563.6 | 43.93 | 56.36 | 100.3 |
| PS + FeOx—Al2O3_C (Fe 71.4 wt. %; Al 28.6 wt. %; Citric acid) | 350 | 24.1 | 622.8 | 30.37 | 62.28 | 92.6 |
| PE + FeOx—Al2O3_C (Fe 60 wt. %; Al 40 wt. %) | 600 | 33.9 | 539.9 | 54.81 | 53.99 | 108.8 |

TABLE 7-continued

H₂ yield and mass balance over various catalysts.

| Sample | Gas volume (mL) | H₂ yield (mmol H₂/g-plastics) | Carbon yield (mg-C/g-plastics) | gas yield (wt. %) | Carbon deposition (wt. %) | Mass balance |
|---|---|---|---|---|---|---|
| PE + FeOx—Al2O3_C (Fe 71.4 wt. %; Al 28.6 wt. %; Citric acid) | 700 | 42.7 | 616.1 | 46.24 | 61.61 | 107.8 |
| PE + Fe—Al2O3_C (Fe 71.4 wt. %; Al 28.6 wt. %; Citric acid) reduced | 350 | 24.3 | 683.2 | 22.12 | 68.32 | 90.4 |
| PP + FeO—Al2O3_C (Fe 71.4 wt. %; Al 28.6 wt. %; Citric acid) reduced | 350 | 19.8 | 685.0 | 25.62 | 68.50 | 94.1 |
| PE (75 wt. %) + FeOx—Al2O3_C (Fe 71.4 wt. %; Al 28.6 wt. %; Citric acid) | 450 | 17.7 | 693.2 | 24.67 | 69.32 | 94.0 |
| PE (30 wt. %) + FeOx—Al2O3_C (Fe 71.4 wt. %; Al 28.6 wt. %; Citric acid) | 480 | 45.5 | 198.4 | 71.36 | 19.84 | 91.2 |
| PE + FeOx—Al2O3_C (Fe 81.3 wt. %; Al 18.7 wt. %; Citric acid) reduced | 350 | 14.8 | 472.0 | 44.46 | 47.20 | 91.7 |
| PE + Fe/AC | 280 | 23.2 | 490.3 | 36.27 | 49.03 | 85.3 |
| PE + Fe/SiC | 120 | 4.2 | 644.8 | 14.84 | 64.48 | 79.3 |
| PE + FeNiOx—Al2O3—C (Fe 37.5 wt. %; Ni 37.5 wt. %; Al 25 wt. %; Citric acid) | 380 | 23.6 | 780.7 | 25.81 | 78.07 | 103.9 |
| PE + Fe Al2O3_C_reduced (Fe 60 wt. %; Al 40 wt. %) | 420 | 17.9 | 480.6 | 47.11 | 48.06 | 95.2 |
| PE + CH4 pre-treated Fe—Al2O3—C (Fe 71.4 wt. %; Al 28.6 wt. %; Citric acid) | 230 | 10.6 | 727.7 | 29.01 | 72.77 | 101.8 |
| PE + Fe2O3—C (Fe 100%; Citric acid) | 450 | 26.5 | 402.2 | 57.51 | 40.22 | 97.7 |
| PE + FeOx—Al2O3_C (Fe 60 wt. %; Al 40 wt. %; Citric acid) | 400 | 26.8 | 682.3 | 30.18 | 68.23 | 98.4 |
| PE + FeOx—Al2O3—C (Fe 50%; Al 50%; Citric acid) | 330 | 18.3 | 740.1 | 32.55 | 74.01 | 106.6 |
| PE + Fe2O3 | 700 | 42.2 | 364.1 | 65.06 | 36.41 | 101.5 |
| Plastics mixtures (PE 75%; PP 20%; PS 5%) + FeOx—Al2O3—C (Fe 71.4 wt. %; Al 28.6 wt. %; Citric acid) | 600 | 39.4 | 579.7 | 50.25 | 57.97 | 108.2 |
| PE + Fe—Co—Mn—Na | 550 | 32.9 | 360.0 | 47.47 | 36.00 | 83.5 |
| PE + Fe | 270 | 9.0 | 547.9 | 32.97 | 54.79 | 87.8 |
| PE + FeOx—Al2O3—C (95% Fe powder + 5% Al(NO3)3 + citric acid) | 640 | 37.6 | 346.3 | 55.99 | 34.63 | 90.6 |
| PE + FeOx – Fe from iron powder | 260 | 12.1 | 458.0 | 30.61 | 45.80 | 76.4 |
| PE + FeOx—Al2O3—C (Fe 90% +Al 10% + citric acid) | 850 | 57.0 | 380.8 | 59.28 | 38.08 | 97.4 |
| PE + Fe—Al2O3—C (Fe 50%; Al 50%; Citric acid) | 285 | 12.9 | 530.0 | 30.99 | 53.00 | 84.0 |

5. Evaluation of Energy Efficiency

The microwave-initiated waste plastics dehydrogenation using Fe-based catalysts is a rapid and efficient process. The energy efficiency of this process is evaluated by the "Net energy balance" (NEB) ratio which simply gives the ratio of chemical energy derived from the products (energy out) to the energy invested (energy in) in the process (shown below).

NEB=(Energy In)/(Energy out)

Giving the ratio of chemical energy (energy out) as the enthalpy of combustion of only the hydrogen produced from the plastics, to the energy invested (energy in) as the absorbed microwave power in the process, the energy efficiency of the process is represented by:

NEB (Energy efficiency)=(Enthalpy of combustion of produced hydrogen)/((absorbed microwave power)×reaction time).

Figure 8A:
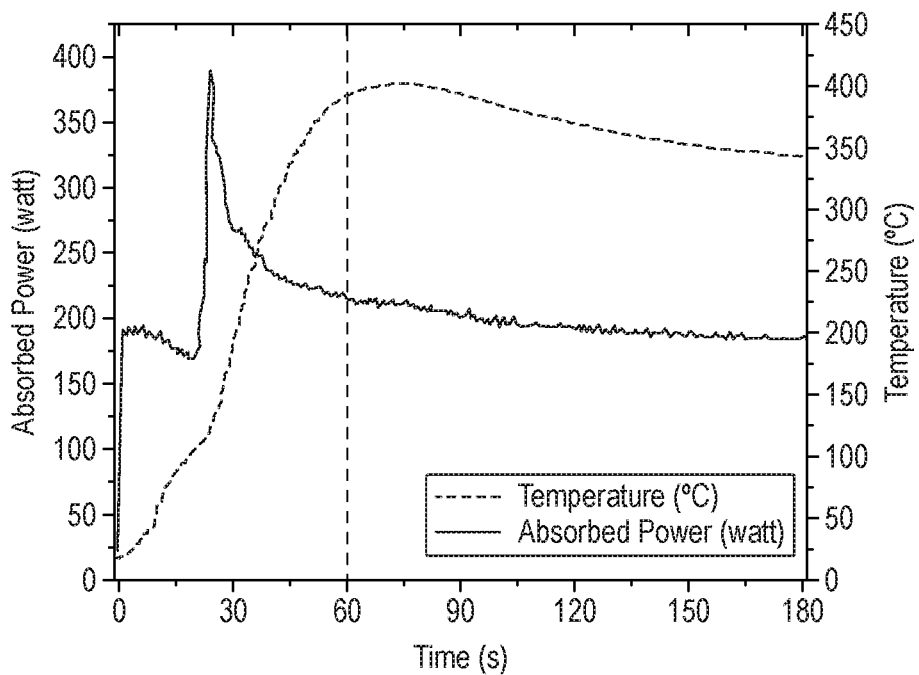
FIG. 8A shows absorbed MW power and reaction temperature for polyethylene (PE) dehydrogenation over FeOx·Al$_2$O$_3$_C (Fe 74.4 wt. %; Al 28.6 wt. %) catalyst.
Figure 8B:
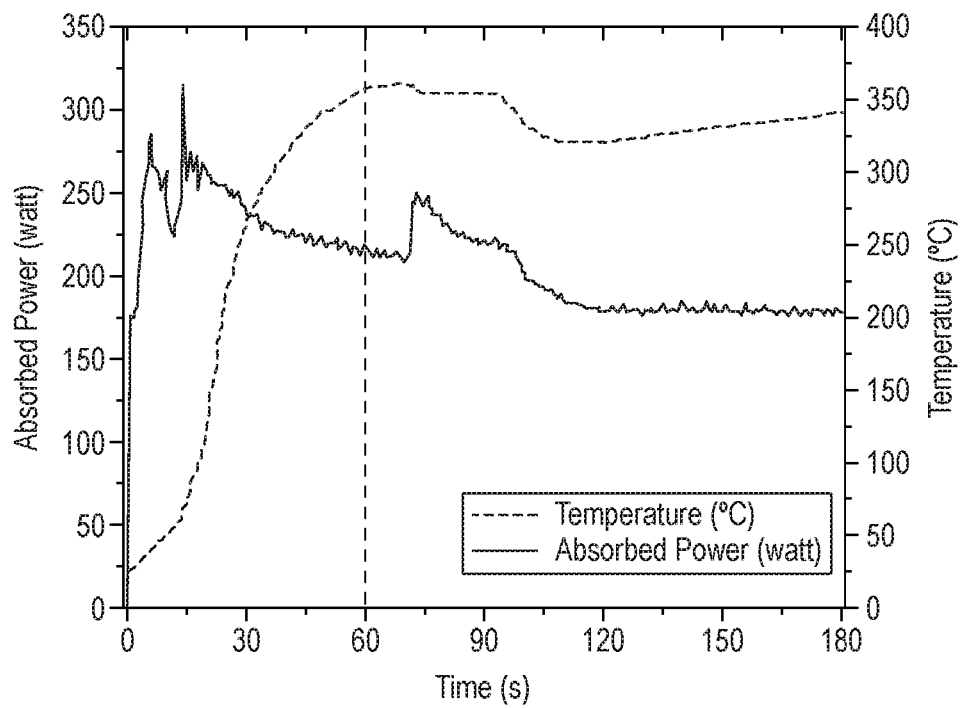
FIG. 8C shows absorbed MW power and reaction temperature for polyethylene (PE) dehydrogenation over FeOx·Al$_2$O$_3$_C (Fe 90 wt. %; Al 10 wt. %) catalyst.
Figure 8C:
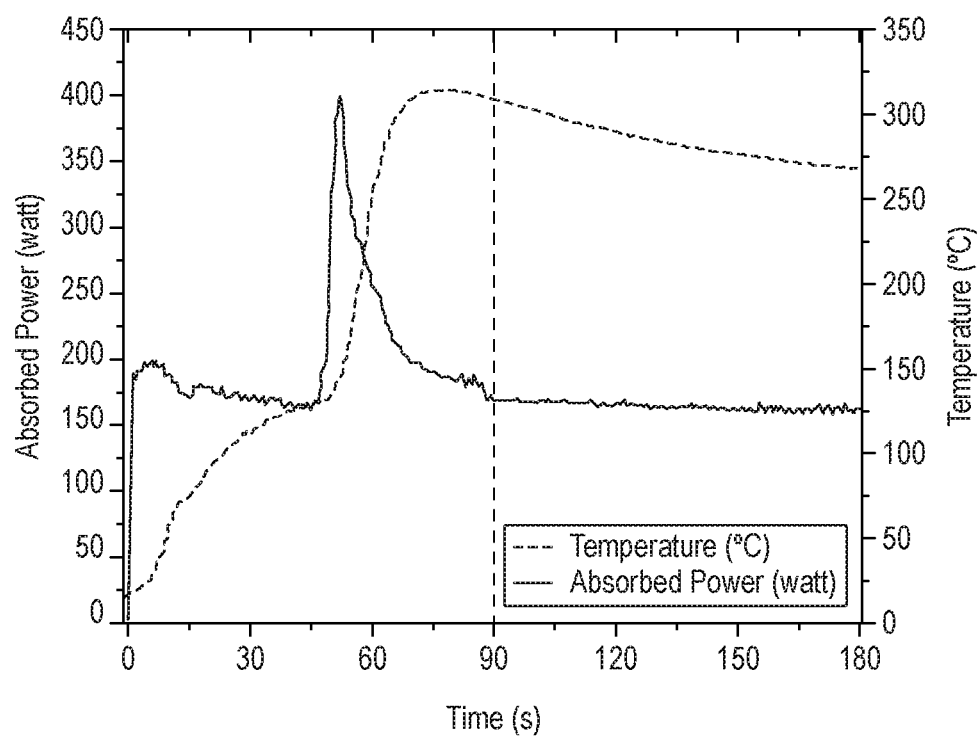

FIG. 8A-C summarise PE dehydrogenation over FeOx·Al2O3_C (Fe 74.4 wt. %; Al 28.6 wt. %) (FIG. 8A) or FeOx·Al2O3_C (Fe 90 wt. %; Al 10 wt. %) (FIG. 8B) catalyst, and PP dehydrogenation over FeOx·Al2O3_C (Fe 74.4 wt. %; Al 28.6 wt. %) (FIG. 8C) catalyst.

The reaction is rapid and about 400-550 mL of gases are obtained at a period of 1-1.5 min. And a total 700-850 mL of gases were collected at about 3 min. Thus, in Table 8 (below) the energy efficiency for two parts of the process is calculated: one is the energy efficiency between 0-1 min and the other the overall energy efficiency for the process.

The overall energy efficiency of the microwave-initiated waste plastics dehydrogenation is about 20-25%. More than half of the total products are generated in the first 1 minute. The energy efficiency for the first minute ranges between about 33-40% (Table 8).

In addition, the overall reaction temperature recorded by IR parameter were only about 300-400° C.

TABLE 8

Summary of energy efficiency of polyethylene (PE) and polypropylene (PP) dehydrogenation over Fe-based catalyst.

| Sample | Energy Efficiency (0-1 min) | Overall Energy Efficiency (0-3 min) |
|---|---|---|
| PE + FeOx—Al2O3—C (Fe 74.4% + Al 28.6%) | 33.6 | 20.7 |
| PP + FeOx—Al2O3—C (Fe 74.4% + Al 28.6%) | 33.4 | 23.3 |
| PE + FeOx—Al2O3—C (Fe 90% + Al 10%) | 39.0 | 25.0 |

Figure 9A:
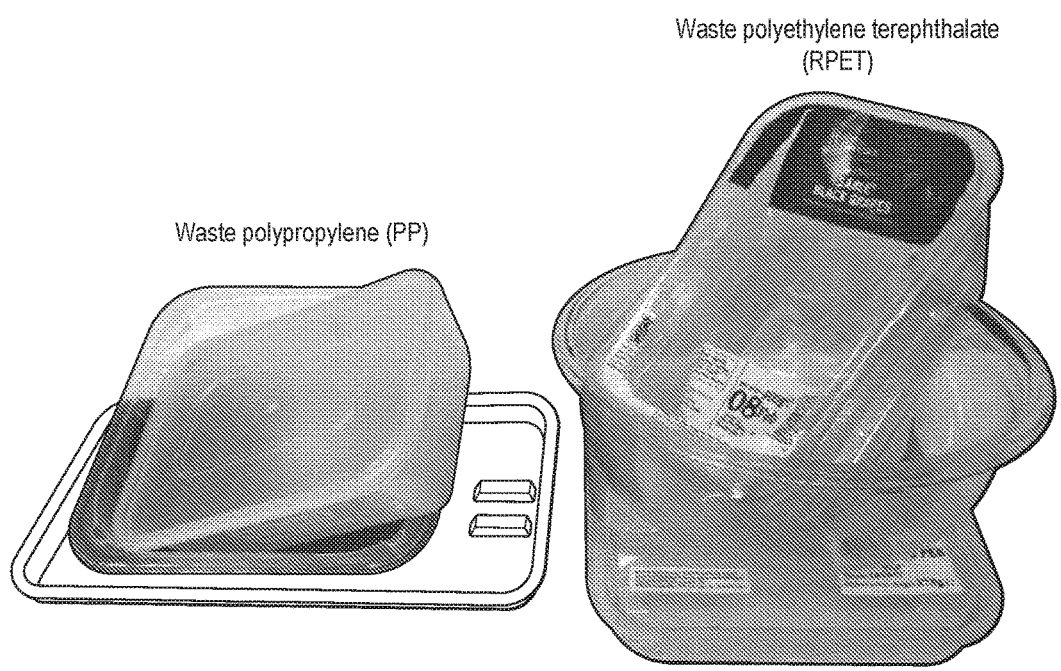
FIG. 9A shows waste plastics from commercial goods.
Figure 9B:
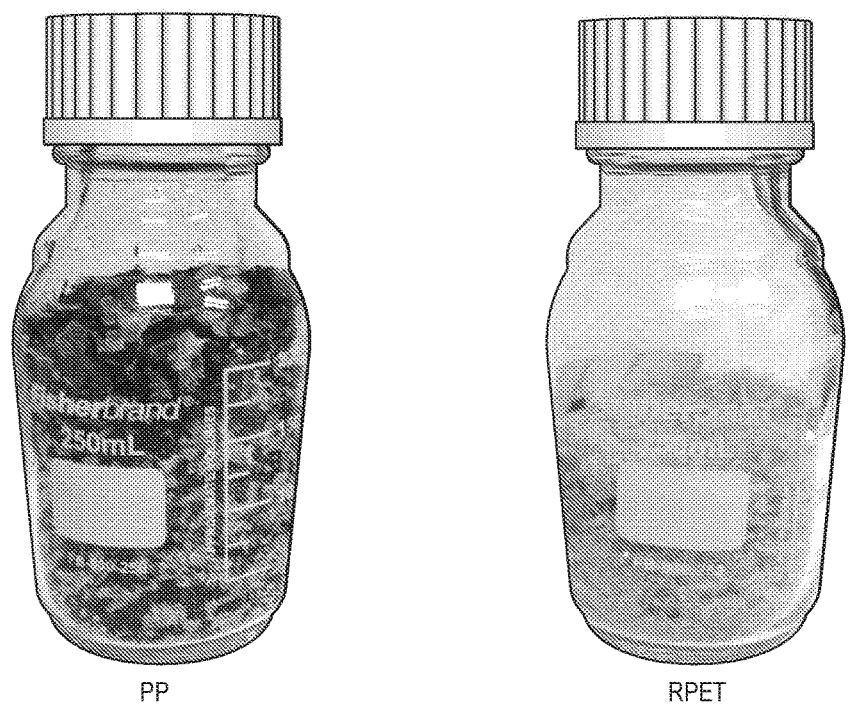
FIG. 9B shows the shredded waste plastics.

6. Commercial Waste Plastics Disposal Through Microwave-Initiated Dehydrogenation A real-world waste plastics recycling scenario was explored through the microwave-initiated dehydrogenation using a FeOx·Al$_2$O$_3$_C (Fe 90 wt. %; Al 10 wt. %) catalyst. The feedstocks were waste plastics from produce sold by big supermarket chains (FIG. 9A). The plastics were first shredded using a blender (FIG. 9B) were then mixed with FeOx·Al$_2$O$_3$_C catalysts. The mixtures were exposed to the microwave irradiation for the dehydrogenation process.

The waste plastics were rapidly dehydrogenated to gases and carbons and the experimental results were summarised in Tables 9 and Table 10.

TABLE 9

GC analysis on evolved gas composition (vol. %) of waste plastics dehydrogenation using FeOx•Al2O3_C (Fe 90 wt. %; Al 10 wt. %) catalyst.

| Plastics | H$_2$ | CH$_4$ | C$_2$H$_4$ | C$_2$-C$_5$ | CO$_2$ | CO |
|---|---|---|---|---|---|---|
| W-RPET | 32.1 | 1.5 | 0.9 | 0.2 | 12.9 | 52.5 |
| w-PP | 73.1 | 7.9 | 1.0 | 4.3 | 2.5 | 11.2 |

TABLE 10

Summary of experimental results of waste plastics dehydrogenation using FeOx•Al2O3_C (Fe 90 wt. %; Al 10 wt. %) catalyst.

| Plastics | Gas volume (mL) | H$_2$ yield (mmol H$_2$/g-plastics) | Carbon yield (mg-C/g-plastics) | Gas yield (wt. %) | Carbon deposition (wt. %) | Mass balance |
|---|---|---|---|---|---|---|
| W-RPET | 550 | 13.6 | 113.4 | 91.31 | 11.34 | 102.7 |
| w-PP | 670 | 41.3 | 498.8 | 50.67 | 49.88 | 100.5 |

Table 9 shows that a selectivity of 73% for hydrogen was obtained in the exiting gas stream from the waste PP dehydrogenation. And the H$_2$ yield of waste PP dehydrogenation is 41.3 mmol/g-plastic. Both the H$_2$ selectivity and the H$_2$ yield are nearly the same as the results obtained from the pure PP that bought from Sigma-Aldrich.

Table 10 shows that about 32% hydrogen and 52 vol. % of CO were generated by PET ([C$_{10}$H$_8$O$_4$]$_n$) dehydrogenation under microwave irradiation. The higher levels of CO was because the oxygen contained in both the feedstock and the catalyst. Nevertheless, it was shown that PET can be rapidly dehydrogenated under microwave irradiation in a period of 3 minutes to use useful products such as syngas.

7. Conclusion

It has been demonstrated that high yields of hydrogen can be readily extracted from plastics, such as polyethylene (PE), polypropylene (PP) and polystyrene (PS) (the main waste plastics) through microwave-initiated dehydrogenation using iron-based catalysts. The dehydrogenation process is typically complete in periods of about 1 minute and a selectivity of over 75% for hydrogen was obtained in the exiting gas stream. Instead of the production of pyrolysis oil from waste plastics, high-purity hydrogen and high value carbon nanotubes were rapidly obtained from waste plastics.

The hydrogen yield reached 57.0 mmol/g-plastics with nearly 97 wt. % of hydrogen contained in the plastics was extracted. In a successive cycle of tests for PE dehydrogenation using FeOx·Al$_2$O$_3$—C(Fe 74.4 wt. %; Al 28.6 wt. %) catalyst, it is estimated that 1 g of catalyst could dehydrogenate over 10.5 g PE and generate more than 9066 mL hydrogen and the catalyst still remains active.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise paragraphed. No language in the specification should be construed as indicating any non-paragraphed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the paragraphs appended hereto as permitted by applicable law.

REFERENCES

1. P. P. Edwards, V. L. Kuznetsov, W. I. F. David, N. P. Brandon, Hydrogen and fuel cells: Towards a sustainable energy future. *Energy Policy* 36, 4356-4362 (2008).
2. D. P. Gregory, D. Y. C. Ng, G. M. Long, The hydrogen economy. *Electrochem. Cleaner Environ.*, 226-280 (1972).
3. J. A. Turner, Sustainable Hydrogen Production. *Science* (Washington, D.C., U. S.) 305, 972-974 (2004).
4. M. Ni, M. K. H. Leung, D. Y. C. Leung, K. Sumathy, A review and recent developments in photocatalytic watersplitting using for hydrogen production. *Renewable and Sustainable Energy Reviews* 11, 401-425 (2007).
5. J. Turner et al., Renewable hydrogen production. *Int. J. Energy Res.* 32, 379-407 (2008).
6. L. Schlapbach, A. Zuettel, Hydrogen-storage materials for mobile applications. *Nature* (London, U. K.) 414, 353-358 (2001).
7. M. L. Wald, Questions about a hydrogen economy. *Sci. Am.* 290, 66-73 (2004).
8. B. Sakintuna, F. Lamari-Darkrim, M. Hirscher, Metal hydride materials for solid hydrogen storage: A review. *International Journal of Hydrogen Energy* 32, 1121-1140 (2007).
9. Z. Xiong et al., High-capacity hydrogen storage in lithium and sodium amidoboranes. *Nat Mater* 7, 138-141 (2008).
10. W. Grochala, P. P. Edwards, Thermal Decomposition of the Non-Interstitial Hydrides for the Storage and Production of Hydrogen. *Chem. Rev.* (Washington, D.C., U. S.) 104, 1283-1315 (2004).
11. F. A. Armstrong, J. C. Fontecilla-Camps, A Natural Choice for Activating Hydrogen. *Science* (Washington, D.C., U. S.) 322, 529 (2008).
12. A. Boddien et al., Efficient Dehydrogenation of Formic Acid Using an Iron Catalyst. *Science* (Washington, D.C., U. S.) 333, 1733-1736 (2011).
13. M. Wang, L. Sun, Hydrogen Production by Noble-Metal-Free Molecular Catalysts and Related Nanomaterials. *ChemSusChem* 3, 551-554 (2010).
14. R. M. Navarro, M. A. Pena, J. L. G. Fierro, Hydrogen Production Reactions from Carbon Feedstocks: Fossil Fuels and Biomass. *Chem. Rev.* (Washington, D.C., U. S.) 107, 3952-3991 (2007).
15. R. J. Pearson et al., Energy storage via carbon-neutral fuels made from CO2, water, and renewable energy. *Proc. IEEE* 100, 440-460 (2012).
16. R. Geyer, J. R. Jambeck, K. L. Law, *Science Advances* 2017, 3, 10.1126/sciadv.1700782.

The invention claimed is:

1. A process for producing hydrogen comprising exposing a solid composition comprising one or more thermoplastic polymers to electromagnetic radiation in the presence of a solid catalyst, wherein the solid catalyst comprises an iron oxide, alumina, and carbon, wherein iron is present in about 70 wt. % to about 95 wt. % of the solid catalyst, wherein the one or more thermoplastic polymers is/are polyethylene, polypropylene, or polystyrene, wherein the electromagnetic radiation is microwave radiation, and wherein the process produces about 70 vol. % or more of hydrogen in a total amount of evolved gas.

2. The process according to claim 1 wherein the iron oxide comprises ferric oxide ($Fe_2O_3$).

3. The process according to claim 1 wherein the iron is present in about 90 wt. % to about 95 wt. % of the total weight of the catalyst.

4. The process according to claim 1 wherein the ratio of the iron to the alumina is about 1:1 to about 100:1.

5. The process according to claim 1 wherein the carbon is present between about 1 wt. % and about 10 wt. % of the total weight of the catalyst.

6. The process according to claim 1 wherein the catalyst comprises particles of the iron oxide which have a mean particle size of between 50 nm and 1 mm.

7. The process according to claim 1 wherein the solid composition comprises the one or more thermoplastic polymers and the catalyst in admixture.

8. The process according to claim 1 wherein the ratio of the polymer(s) to the catalyst is about 5:1 to about 1:5.

9. The process according to claim 1 wherein the solid composition is comprised of at least 40% (w/w) of the one or more thermoplastic polymers.

* * * * *